US006754007B2

(12) United States Patent
Yamakawa et al.

(10) Patent No.: US 6,754,007 B2
(45) Date of Patent: Jun. 22, 2004

(54) ONE-DIMENSIONAL OPTICAL CONDENSING SYSTEM, OPTICAL LIGHTING SYSTEM FOR CORRECTING LIGHT INTENSITY DISTRIBUTION, AND EXPOSURE HEAD

(75) Inventors: Hiromitsu Yamakawa, Saitama (JP); Yoji Okazaki, Kaisei-machi (JP); Kazuhiko Nagano, Kaisei-machi (JP); Hiromi Ishikawa, Kaisei-machi (JP)

(73) Assignees: Fuji Photo Optical Co., Ltd., Saitama (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/396,789

(22) Filed: Mar. 25, 2003

(65) Prior Publication Data
US 2003/0218805 A1 Nov. 27, 2003

(30) Foreign Application Priority Data
Mar. 29, 2002 (JP) ........................................ 2002-094470
May 14, 2002 (JP) ........................................ 2002-139187

(51) Int. Cl.[7] ........................ G02B 13/08; G02B 13/18; G02B 9/12; G02B 9/00
(52) U.S. Cl. ........................ 359/668; 359/671; 359/708; 359/716; 359/784; 359/754
(58) Field of Search ............................ 359/668, 671, 359/754, 784, 207, 641, 708, 716, 719, 738, 786–788

(56) References Cited

U.S. PATENT DOCUMENTS

| 5,095,386 A | * | 3/1992 | Scheibengraber ............ 359/668 |
| 6,016,227 A | * | 1/2000 | Hopkins et al. ............. 359/668 |
| 6,052,236 A | * | 4/2000 | Nakasuji et al. ............. 359/718 |
| 2003/0011891 A1 | * | 1/2003 | Suzuki et al. ................ 359/668 |

* cited by examiner

Primary Examiner—Georgia Epps
Assistant Examiner—Jack Dinh
(74) Attorney, Agent, or Firm—Frommer Lawrence & Haug LLP; Matthew K. Ryan

(57) ABSTRACT

Provided are an optical correcting system which can form a linear image or illuminating light having a substantially uniform light intensity distribution without reducing the efficiency of use of light, and an exposure head which can perform excellent exposure by using the linear image or the illuminating light. Light flux from a light source is collimated by the function of a collimator lens, and the collimated light flux enters into an optical correcting system for correcting light intensity distribution. The optical correcting system for correcting light intensity distribution changes the width of the light flux at the exit position at which each collimated light flux exits so that the light intensity distribution of a linear image is uniform when the collimated light flux is formed into the linear image. A change of the widths of the light flux allows utilizing the light flux at the mid-section generally having a high light intensity distribution for the peripheral having an insufficient light intensity, thereby uniformalizing the light intensity distribution of the linear image without reducing the efficiency of use of light as a whole.

17 Claims, 21 Drawing Sheets

FIG. 5A

| | EXAMPLE 1-1 · PRIMARY LENS DATA | | | |
|---|---|---|---|---|
| Si (SURFACE NUMBER) | rhi (CURVATURE RADIUS IN DIRECTION ALONG LINEAR IMAGE) | rvi (CURVATURE RADIUS) | di (DISTANCE BETWEEN SURFACES) | Ni (REFRACTIVE INDEX) |
| 0 LIGHT SOURCE | 0.000 | | 28.670 | |
| COLLIMATOR 01 | −44.560 | −44.560 | 10.000 | 1.60525 |
| 02 | −28.850 | −28.850 | 0.500 | 1.00000 |
| 03 | −499.996 | −499.996 | 10.000 | 1.60525 |
| 04 | −66.282 | −66.282 | 0.500 | 1.00000 |
| 05 | −203.424 | −203.424 | 8.000 | 1.65060 |
| 06 | 41.260 | 41.260 | 1.106 | 1.00000 |
| 07 | 43.267 | 43.267 | 13.000 | 1.49892 |
| 08 | −43.267 | −43.267 | 5.000 | 1.00000 |
| OPTICAL CORRECTING SYSTEM 09 | NON-CYLINDRICAL SURFACE | ∞ | 5.000 | 1.52811 |
| 10 | ∞ | ∞ | 50.000 | 1.00000 |
| 11 | ∞ | ∞ | 7.000 | 1.52811 |
| 12 | NON-CYLINDRICAL SURFACE | ∞ | 10.000 | 1.00000 |
| OPTICAL CONDENSING SYSTEM 13 | ∞ | NON-CYLINDRICAL SURFACE | 10.000 | 1.52811 |
| 14 | ∞ | ∞ | 43.456 | 1.00000 |

FIG. 5B

| | EXAMPLE 1-1 · ASPHERIC SURFACE DATA | | |
|---|---|---|---|
| | 9th SURFACE | 12th SURFACE | 13th SURFACE |
| C | −7.88098E−03 | −6.35558E−03 | 3.78709E−02 |
| K | 4.71402E+01 | 8.73591E−02 | 4.52651E−01 |
| a3 | 4.56294E−05 | 4.38317E−05 | 0 |
| a4 | −5.21059E−06 | −6.05068E−06 | −1.36209E−07 |
| a5 | 1.07299E−06 | 1.97395E−07 | 0 |
| a6 | −5.96589E−09 | 1.93980E−08 | −3.16066E−10 |
| a7 | −3.01141E−11 | 8.62698E−11 | 0 |
| a8 | −8.39190E−14 | 2.49448E−13 | −2.99537E−13 |
| a9 | −1.86139E−16 | 5.92234E−16 | 0 |
| a10 | −3.65124E−19 | 1.25573E−18 | −1.33784E−16 |

FIG. 10A

| | EXAMPLE 1-2 · PRIMARY LENS DATA | | | | |
|---|---|---|---|---|---|
| | Si (SURFACE NUMBER) | rhi (CURVATURE RADIUS IN DIRECTION ALONG LINEAR IMAGE) | rvi (CURVATURE RADIUS) | di (DISTANCE BETWEEN SURFACES) | Ni (REFRACTIVE INDEX) |
| OPTICAL CORRECTING SYSTEM | 09 | NON-CYLINDRICAL SURFACE | ∞ | 5.000 | 1.52811 |
| | 10 | ∞ | ∞ | 50.000 | |
| | 11 | ∞ | ∞ | 7.000 | 1.52811 |
| | 12 | NON-CYLINDRICAL SURFACE | ∞ | | |

FIG. 10B

| EXAMPLE 1-2 · ASPHERIC SURFACE DATA | | |
|---|---|---|
| | 9th SURFACE | 12th SURFACE |
| C | -1.8522E-02 | 1.4125E-04 |
| K | -1.9675E+01 | -3.7443E+00 |
| a3 | -1.8541E-04 | -6.9144E-05 |
| a4 | 3.9630E-05 | 2.1390E-05 |
| a5 | -8.0724E-07 | -2.0987E-06 |
| a6 | -7.0047E-09 | 9.1221E-08 |
| a7 | 1.4656E-11 | 4.4468E-10 |
| a8 | 1.5734E-13 | 1.3480E-12 |
| a9 | 6.2154E-16 | 3.3067E-15 |
| a10 | 1.7997E-18 | 7.1891E-18 |

FIG. 13A

| EXAMPLE 1-3 · PRIMARY LENS DATA |||||
|---|---|---|---|---|
| Si (SURFACE NUMBER) | ri (CURVATURE RADIUS) | di (DISTANCE BETWEEN SURFACES) | Ni (REFRACTIVE INDEX) ||
| 09 | ASPHERICAL SURFACE | 5.000 | 1.52811 ||
| 10 | ∞ | 50.000 | ||
| 11 | ∞ | 7.000 | 1.52811 ||
| 12 | ASPHERICAL SURFACE | | ||

OPTICAL CORRECTING SYSTEM { surfaces 09–12 }

FIG. 13B

| EXAMPLE 1-3 · ASPHERIC SURFACE DATA |||
|---|---|---|
| | 9th SURFACE | 12th SURFACE |
| C | -1.4098E-02 | -9.8506E-03 |
| K | -4.2192E+00 | -3.6253E+01 |
| a3 | -1.0027E-04 | -8.9980E-05 |
| a4 | 3.0591E-05 | 2.3060E-05 |
| a5 | -4.5115E-07 | -2.2860E-06 |
| a6 | -8.2819E-09 | 8.7661E-08 |
| a7 | 4.1020E-12 | 4.4028E-10 |
| a8 | 1.2231E-13 | 1.3624E-12 |
| a9 | 5.3753E-16 | 3.3965E-15 |
| a10 | 1.6315E-18 | 7.4823E-18 |

ONE-DIMENSIONAL OPTICAL CONDENSING SYSTEM, OPTICAL LIGHTING SYSTEM FOR CORRECTING LIGHT INTENSITY DISTRIBUTION, AND EXPOSURE HEAD

BACKGROUND OF THE INVENTION

1. Field of the Invention

The invention relates to a one-dimensional optical condensing system which condenses light flux in only one direction so as to form a linear image, and an exposure head which performs exposure by using a linear image formed by the one-dimensional optical condensing system. More particularly, the invention relates to an optical lighting system for correcting light intensity distribution which illuminates a spatial modulator or the like, and an exposure head which performs exposure by using illuminating light emitted by the optical lighting system for correcting light intensity distribution.

2. Description of the Related Art

An optical correcting system for forming a linear image can comprise, for example, a combination of a collimator lens for collimating light flux emitted from a light source and a cylindrical lens having the function of condensing the collimated light flux in only one direction. The above-mentioned one-dimensional optical condensing system is used in, for example, an apparatus which forms a two-dimensional image on a screen by using another optical correcting system for projecting and scanning a linear image formed by the optical condensing system on the screen. The one-dimensional optical condensing system may be used in an exposure head using a one-dimensional spatial modulator.

The above-mentioned one-dimensional optical condensing system has the following problems. When light flux emitted from the light source is circular or elliptical in cross section, a light intensity distribution (i.e., a light quantity distribution) of a linear image, which is formed by condensing the light flux emitted from the light source in one direction, is high at its midsection and low at its peripheral part as shown in FIG. 9. In FIG. 9, the horizontal axis indicates the coordinate of a linear image in the direction in which the linear image is formed with respect to an optical axis, and the vertical axis indicates a light intensity ratio (%).

When light flux emitted from the light source is rectangular in cross section, the light intensity distribution of a linear image is substantially uniform even if the linear image is formed by condensing the light flux in one direction. A rectangular aperture can be provided as a method for forming the cross section of light flux into a rectangular shape. However, a problem exist: more specifically, when the aperture is inserted so as to change circular or elliptical light flux into rectangular light flux, an eclipse of light occurs due to the aperture, and this causes a decrease in the efficiency of use of light.

Moreover, an optical filter having low transmittance at the midsection and high transmittance at the peripheral part can be inserted as a method for making the light intensity distribution of a linear image substantially uniform. However, also in this case, there is a problem, that is, a decrease in the efficiency of use of light of a light flux at the midsection in particular.

The above-mentioned problems of nonuniformity of the light intensity distribution may be involved in, for example, illuminating light for illuminating a two-dimensional spatial modulator for use in an exposure head, as well as light for forming a linear image. For instance, when a laser light source is used as the light source and light flux emitted from the light source is collimated by a collimator so as to use the collimated light flux as illuminating light, the light intensity distribution of the illuminating light is generally the Gaussian distribution, which exhibits a high light intensity at the midsection and a low light intensity at the peripheral part. Thus, the light intensity distribution is non-uniform, and this may prevent excellent exposure.

SUMMARY OF THE INVENTION

The invention is designed to overcome the foregoing problems. It is a first object of the invention to provide a one-dimensional optical condensing system which can form a linear image having a substantially uniform light intensity distribution without reducing the efficiency of use of light, and an exposure head which can perform excellent exposure by using a linear image formed by the one-dimensional optical condensing system.

It is a second object of the invention to provide an optical lighting system for correcting light intensity distribution which can obtain illuminating light having a substantially uniform light intensity distribution without reducing the efficiency of use of light, and an exposure head which can perform excellent exposure by using illuminating light emitted by the optical lighting system for correcting light intensity distribution.

A one-dimensional optical condensing system according to a first aspect of the invention, which condenses parallel light flux from a light source in one direction so as to form a linear image, comprises an optical correcting system for correcting light intensity distribution, which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection; and an optical condensing system which condenses the light flux from the optical correcting system in only one direction, thereby forming a linear image which has a substantially uniform light intensity distribution.

A one-dimensional optical condensing system according to a second aspect of the invention, which condenses light flux in one direction so as to form a linear image, comprises a light source; a collimator lens which collimates light flux emitted from the light source; an optical correcting system for correcting light intensity distribution, which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection; and an optical condensing system which condenses the light flux from the optical correcting system in only one direction, thereby forming a linear image which has a substantially uniform light intensity distribution.

In the one-dimensional optical condensing system according to the first and second aspects of the invention, parallel light flux enters into the optical correcting system for correcting light intensity distribution. The optical correcting system changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection, thereby performing correction so that a linear image may have a substantially uniform light intensity distribution when the linear image is formed by the parallel light flux. In other words, the incoming light flux having the same width is changed in such a manner that a light flux width at the midsection is expanded, and a light flux width at the peripheral part is reduced. This makes it possible to utilize the light flux at the midsection for the peripheral part, so that the light intensity distribution of the linear image can be made substantially uniform without reducing the efficiency of use of light as a whole.

In the one-dimensional optical condensing system according to the first and second aspects of the invention, the optical correcting system is configured to have refractive power in only the longitudinal direction of the linear image and have no power in the direction perpendicular to the linear image.

In the one-dimensional optical condensing system according to the first and second aspects of the invention, when the optical correcting system is adapted to provide outgoing light flux having the same overall width as the overall width of incoming parallel light flux, a light flux-width at the midsection is expanded, and a light flux width at the peripheral part is reduced.

In the one-dimensional optical condensing system according to the first and second aspects of the invention, when the optical correcting system is adapted to "reduce" the overall width of incoming parallel light flux so as to provide outgoing light flux having a less overall width, the reduction ratio of a light flux width at the midsection may be smaller than the reduction ratio of a light flux width at the peripheral part.

In the one-dimensional optical condensing system according to the first and second aspects of the invention, when the optical correcting system is adapted to "expand" the overall width of incoming parallel light flux so as to provide outgoing light flux having a larger overall width, an expansion ratio of a light flux width at the midsection may be larger than an expansion ratio of a light flux width at the peripheral part.

As described above, the one-dimensional optical condensing system according to the first and second aspects of the invention is applicable regardless of whether light is expanded or reduced in width as a whole or not.

An optical lighting system for correcting light intensity distribution of the invention comprises a light source; a collimator lens which collimates light flux emitted from the light source so as to form illuminating light; an optical correcting system which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection, thereby forming the illuminating light having a substantially uniform light intensity distribution on a surface to be illuminated.

In the optical lighting system for correcting light intensity distribution of the invention, the collimator lens collimates light flux emitted from the light source, thereby forming illuminating light. The optical correcting system changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection, thereby forming the illuminating light having a substantially uniform light intensity distribution on a surface to be illuminated. Namely, the incoming light flux having the same width is changed in such a manner that a light flux width at the midsection is expanded, and a light flux width at the peripheral part is reduced. This makes it possible to utilize the light flux at the midsection for the peripheral part, so that the light intensity distribution of the linear image can be made substantially uniform without reducing the efficiency of use of light as a whole.

An exposure head according to the first aspect of the invention comprises a one-dimensional optical condensing system according to the second aspect of the invention; a one-dimensional spatial modulator which modulates a linear image formed by the one-dimensional optical condensing system; and an optical image-forming system which forms light flux modulated by the spatial modulator into an image on an exposure surface.

In the exposure head according to the first aspect, a linear image having a light intensity distribution substantially uniformalized by the optical correcting system for correcting light intensity distribution of the one-dimensional optical condensing system is formed on the spatial modulator, and the linear image is modulated by the spatial modulator. The modulated light is formed into an image on the exposure surface by the optical image-forming system. Thus, the image is used to perform exposure. The linear image having the light intensity distribution substantially uniformalized by the optical correcting system for correcting light intensity distribution is used for exposure, and therefore, excellent exposure can be performed without reducing the efficiency of use of light of the whole optical correcting system.

An exposure head according to the second aspect of the invention comprises an optical lighting system for correcting light intensity distribution of the invention; a two-dimensional spatial modulator which modulates illuminating light from the optical lighting system; and an optical image-forming system which forms light flux modulated by the spatial modulator into an image on an exposure surface.

In the exposure head according to the second aspect, the spatial modulator is illuminated by illuminating light having a light intensity distribution substantially uniformalized by the optical correcting system for correcting light intensity distribution of the optical lighting system for correcting light intensity distribution, and the illuminating light is modulated by the spatial modulator. The modulated light is formed into an image on the exposure surface by the optical image-forming system. Thus, the illuminating light is used to perform exposure. The illuminating light having the light intensity distribution substantially uniformalized by the optical correcting system for correcting light intensity distribution is used for exposure, and therefore, excellent exposure can be performed without reducing the efficiency of use of light of the whole optical correcting system.

Other and further objects, features and advantages of the invention will appear more fully from the following description.

BRIEF DESCRIPTION OF THE DRAWINGS

FIGS. 5A and 5B are tables showing lens data of the one-dimensional optical condensing system according to the example 1-1;

FIGS. 10A and 10B are tables showing lens data of an optical correcting system for correcting light intensity distribution of an example 1-2;

FIGS. 13A and 13B are tables showing lens data of an optical correcting system for correcting light intensity distribution of an example 1-3;

DETAILED DESCRIPTION OF THE PREFERRED EMBODIMENTS

Embodiments of the invention will be described in detail below with reference to the drawings.

First Embodiment

Figure 1A:
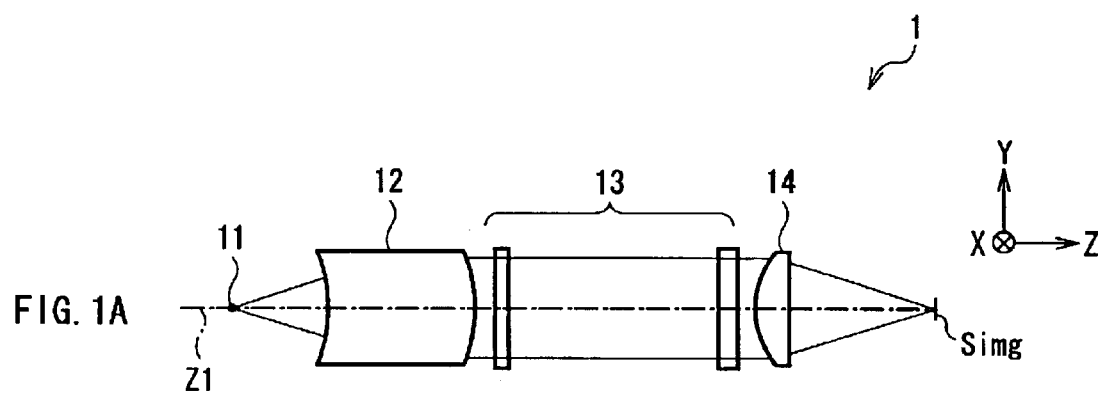
FIGS. 1A and 1B are optical correcting system arrangement diagrams showing an exemplary configuration of a one-dimensional optical condensing system according to a first embodiment of the invention.
Figure 1B:
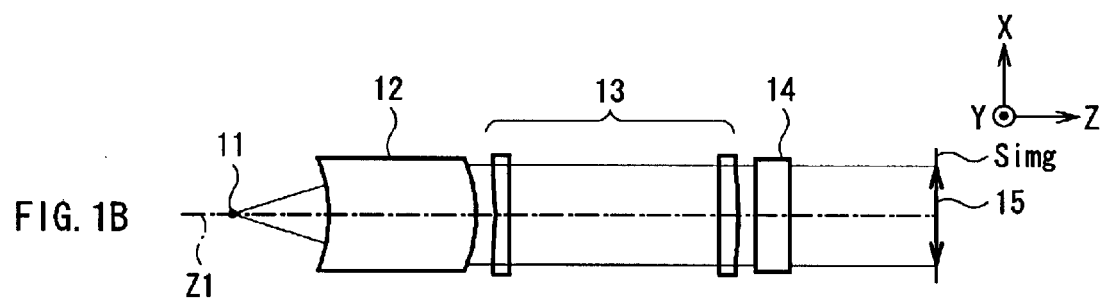

FIGS. 1A and 1B show an exemplary configuration of a one-dimensional optical condensing system according to an embodiment of the invention. FIG. 1B shows a cross section of the system viewed in the direction in which a linear image is formed, and FIG. 1A shows a cross section of the system viewed in the direction perpendicular to the cross section shown in FIG. 1B.

A one-dimensional optical condensing system 1 serves to form a linear image, and the system 1 is used in, for example, an apparatus which forms a two-dimensional image on a screen by using another optical correcting system for projecting and scanning a linear image on the screen. The one-dimensional optical condensing system 1 is also used in an exposure head using a one-dimensional spatial modulator, as to be described later by referring to a second embodiment.

The one-dimensional optical condensing system 1 comprises a light source 11, a collimator lens 12 for collimating light flux emitted from the light source 11, an optical correcting system 13 for correcting light intensity distribution which corrects a light intensity distribution of the collimated light flux from the collimator lens 12, and an optical condensing system 14 which condenses the light flux from the optical correcting system 13 for correcting light intensity distribution in only one direction so as to form a linear image 15 at an image formation position Simg, and these components are arranged in sequence in the direction in which light flux travel along an optical axis Z1.

The optical condensing system 14 is formed by, for example, a cylindrical lens having no power in the longitudinal direction of the linear image 15 (i.e., the X-direction in FIGS. 1A and 1B) and having power in only the direction perpendicular to the linear image 15 (i.e., the Y-direction in FIGS. 1A and 1B). Contrary to the optical condensing system 14, the optical correcting system 13 for correcting light intensity distribution is configured to have refractive power in only the longitudinal direction of the linear image 15 and have no power in the direction perpendicular to the linear image 15.

The optical correcting system 13 for correcting light intensity distribution functions so that the light intensity distribution of the linear image 15 may be substantially uniform when parallel light flux from the light source 11 are formed into the linear image 15. The optical correcting system 13 for correcting light intensity distribution is adapted to change the width of a light flux at each exit position so that a ratio of an outgoing-light flux width at a peripheral part to an outgoing-light flux width at a midsection near the optical axis Z1 may be smaller than a ratio of an incoming-light flux width at the peripheral part to an incoming-light flux width at the midsection, as will be described in detail later with reference to FIGS. 2A to 2C.

Next, the description is given with regard to the functions and effects of the one-dimensional optical condensing system 1.

In the one-dimensional optical condensing system 1, light flux emitted from the light source 11 are collimated by the function of the collimator lens 12, and then the collimated light flux enter into the optical correcting system 13 for correcting light intensity distribution. The optical correcting system 13 for correcting light intensity distribution changes the width of the light flux at the exit position at which each of the collimated light flux exits so that the light intensity distribution of the linear image 15 may be substantially uniform when the collimated light flux is formed into the linear image 15. The optical condensing system 14 condenses the light flux from the optical correcting system 13 for correcting light intensity distribution in only one direction, thereby forming the linear image 15 at the image formation position Simg. For example, the linear image 15 thus formed is projected and scanned on a screen by means of another optical correcting system, and thus the linear image 15 is formed into a two-dimensional image. The linear image 15 is also used as illuminating light for illuminating a spatial modulator for use in an exposure head.

Figure 2A:
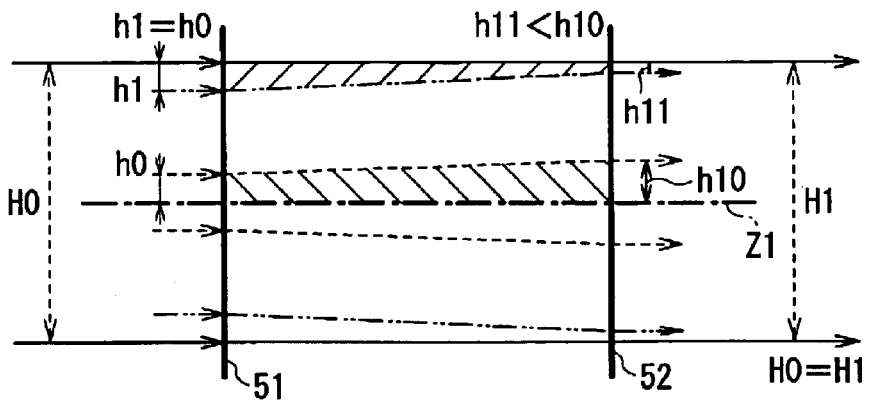
FIGS. 2A to 2C are diagrams of assistance in explaining the concept of the correction of the widths of light flux, which is performed by an optical correcting system for correcting light intensity distribution.

The function of the optical correcting system 13 for correcting light intensity distribution will be now described in further detail with reference to FIGS. 2A to 2C. Firstly, the description is given with regard to the case where the overall width H0 of incoming light flux is the same as the overall width H1 of outgoing light flux as shown in FIG. 2A. Incidentally, parts designated by numerals 51 and 52 in FIG. 2A virtually represent an entry plane and an exit plane of the optical correcting system 13 for correcting light intensity distribution, respectively.

In the optical correcting system 13 for correcting light intensity distribution, the width h0 of an incoming light flux entering into the optical correcting system 13 through the midsection thereof near the optical axis Z1 is assumed to be identical with the width h1 of an incoming light flux entering into the optical correcting system 13 through the peripheral thereof (that is, h0=h1). The optical correcting system 13 for correcting light intensity distribution operates on the incoming light flux having the same width h0 and h1 so as to expand the width h0 of the incoming light flux entering through the midsection and conversely reduce the width h1 of the incoming light flux entering through the peripheral. In other words, the optical correcting system 13 for correcting light intensity distribution functions so that the width h10 of an outgoing light flux at the midsection may be larger than the width h11 of an outgoing light flux at the peripheral part (that is, h11<h10). In terms of a ratio between the widths of the light flux, a ratio of the outgoing-light flux width at the peripheral part to the outgoing-light flux width at the midsection, i.e., "h11/h10", is smaller than a ratio of the incoming-light flux width at the peripheral part to the incoming-light flux width at the midsection (i.e., h1/h0=1) (that is, (h11/h10)<1).

Such a change of the widths of the light flux allows utilizing the light flux at the midsection generally having a high light intensity distribution for the peripheral having an insufficient light intensity, thereby making the light intensity distribution of the linear image 15 substantially uniform without reducing the efficiency of use of light as a whole. The degree of uniformity is, for example, such that variations in light intensity in an effective region fall within 30% or preferably 20%.

Figure 2B:
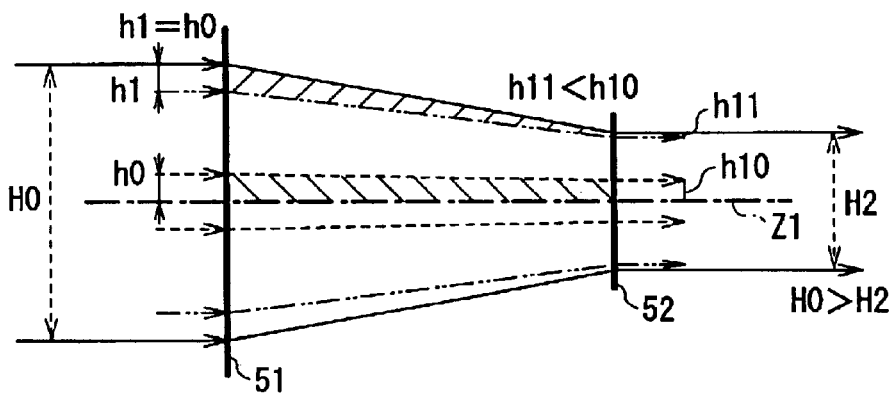
Figure 2C:
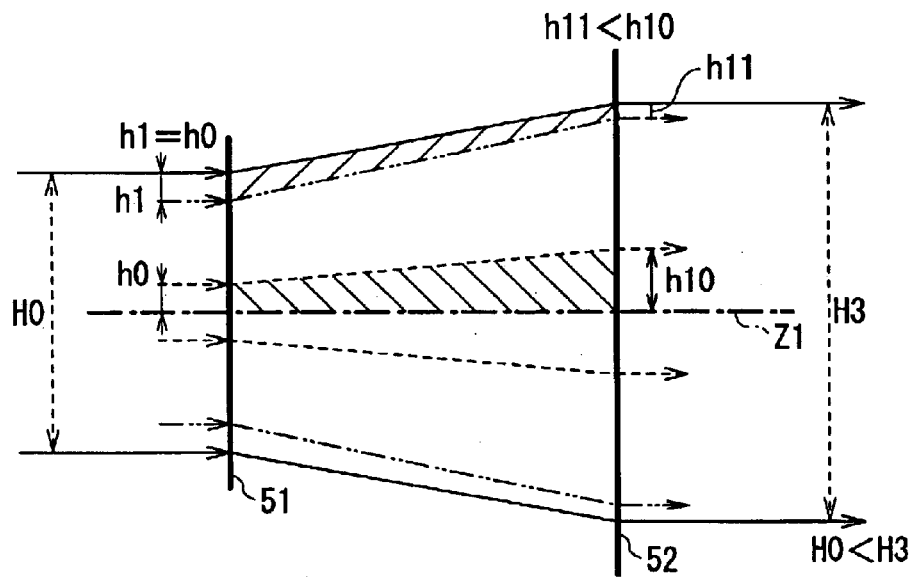

The above-described function and effect of the optical correcting system 13 for correcting light intensity distribution are achieved in the same manner when the overall width of incoming light flux is different from the overall width of outgoing light flux (see FIGS. 2B and 2C).

FIG. 2B illustrates the correction of the widths of light flux, which takes place so as to "reduce" the overall width H0 of incoming light flux to a width H2 (that is, H0>H2) and provide outgoing light flux having the width H2. Also in this case, the optical correcting system 13 for correcting light intensity distribution operates on the incoming light flux having the same width h0 and h1 so that the width h10 of the outgoing light flux at the midsection may be larger than the width of the outgoing light flux at the peripheral part and conversely the width h11 of the outgoing light flux at the peripheral part may be less than the width of the outgoing light flux at the midsection. In terms of the reduction ratio of the light flux, the optical correcting system 13 for correcting light intensity distribution functions so that the reduction ratio of the incoming light flux entering through the midsection may be lower than the reduction ratio of the incoming light flux entering through the peripheral and the reduction ratio of the incoming light flux entering through the peripheral may be higher than the reduction ratio of the incoming light flux entering through the midsection. Also in this case, a ratio of the width of the outgoing light flux at the peripheral part to the width of the outgoing light flux at the midsection, i.e., "h11/h10", is lower than a ratio of the width of the incoming light flux entering through the peripheral to the width of the incoming light flux entering through the midsection (i.e., h1/h0=1)(that is, (h11/h10)<1).

FIG. 2C illustrates the correction of the widths of light flux, which takes place so as to "expand" the overall width H0 of incoming light flux to a width H3 (that is, H0<H3) and provide outgoing light flux having the width H3. Also in this case, the optical correcting system 13 for correcting light intensity distribution operates on the incoming light flux having the same width h0 and h1 so that the width h10 of the outgoing light flux at the midsection may be larger than the width of the outgoing light flux at the peripheral part and conversely the width h11 of the outgoing light flux at the peripheral part may be less than the width of the outgoing light flux at the midsection. In terms of the expansion ratio of the light flux, the optical correcting system 13 for correcting light intensity distribution functions so that the expansion ratio of the incoming light flux entering through the midsection may be higher than the expansion ratio of the incoming light flux entering through the peripheral and the expansion ratio of the incoming light flux entering through the peripheral may be lower than the expansion ratio of the incoming light flux entering through the midsection. Also in this case, a ratio of the width of the outgoing light flux at the peripheral part to the width of the outgoing light flux at the midsection, i.e., "h11/h10", is lower than a ratio of the width of the incoming light flux entering through the peripheral part to the width of the incoming light flux entering through the midsection (i.e., h1/h0=1) (that is, (h11/h10)<1).

As described above, according to the one-dimensional optical condensing system 1 of the first embodiment, the optical correcting system 13 for correcting light intensity distribution changes the width of the light flux at each exit position so that a ratio of the width of the outgoing light flux exiting from the optical correcting system 13 through the peripheral thereof to the width of the outgoing light flux exiting from the optical correcting system 13 through the midsection thereof near the optical axis Z1 may be lower than a ratio of the width of the incoming light flux entering into the optical correcting system 13 through the peripheral thereof to the width of the incoming light flux entering into the optical correcting system 13 through the midsection thereof. Thus, the incoming light flux having the same width are changed in such a manner that the width of the outgoing light flux at the midsection is larger than the width of the outgoing light flux at the peripheral part and the width of the outgoing light flux at the peripheral part is less than the width of the outgoing light flux at the midsection. This makes it possible to utilize the light flux at the midsection for the peripheral, thereby allowing the formation of the linear image 15 having a substantially uniform light intensity distribution without reducing the efficiency of use of light of the whole optical correcting system, as distinct from a method using an aperture or a filter.

Second Embodiment

An exposure head using the one-dimensional optical condensing system 1 of the above-described first embodiment will be described by referring to the second embodiment.

Figure 15A:
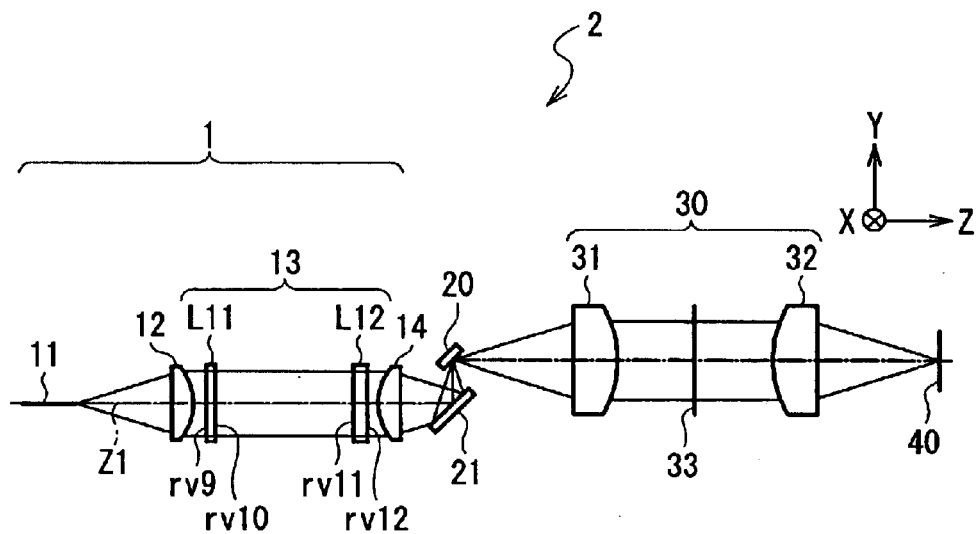
FIGS. 15A and 15B are optical correcting system arrangement diagrams showing an exemplary configuration of an exposure head according to a second embodiment of the invention.
Figure 15B:
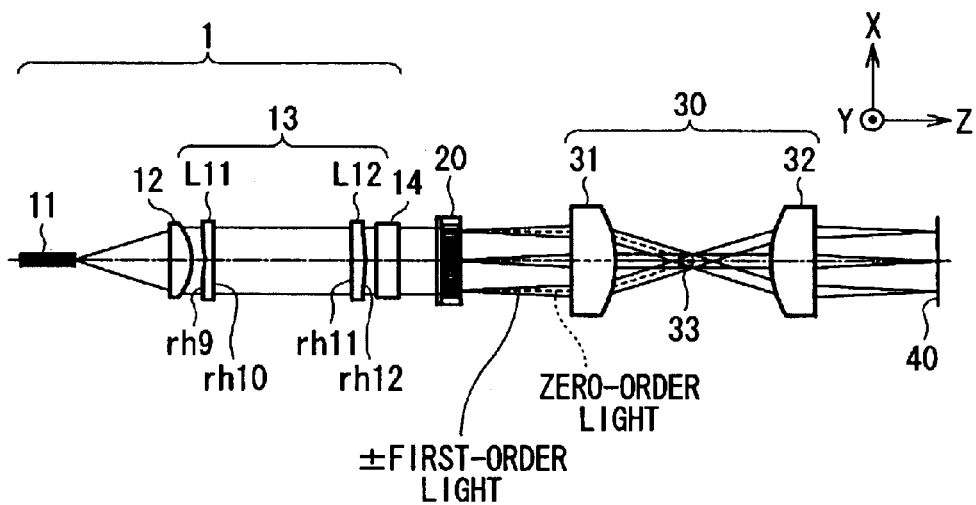

FIGS. 15A and 15B show an exemplary configuration of an exposure head according to the second embodiment of the invention. FIG. 15B shows a cross section of the exposure head viewed in the direction in which a linear image is formed on a one-dimensional spatial modulator 20, and FIG. 15A shows a cross section of the exposure head viewed in the direction perpendicular to the cross section shown in FIG. 16B.

An exposure head 2 comprises the one-dimensional optical condensing system 1 which forms a linear image, the one-dimensional spatial modulator 20 which modulates the linear image from the one-dimensional optical condensing system 1, a reflecting mirror 21 which reflects the linear image from the one-dimensional optical condensing system 1 toward the one-dimensional spatial modulator 20, and an optical image-forming system 30 which forms the modulated light flux from the one-dimensional spatial modulator 20 into an image on an exposure surface 40.

The one-dimensional optical condensing system 1 comprises the light source 11, the collimator lens 12, the optical correcting system 13 for correcting light intensity distribution, and the optical condensing system 14, as described by referring to the above-mentioned first embodiment. The optical correcting system 13 for correcting light intensity distribution is formed by, for example, two lenses L11 and L12 having refractive power in only the longitudinal direction of the linear image. The optical correcting system 13 for correcting light intensity distribution functions so that the light intensity distribution of the linear image, which is formed on the one-dimensional spatial modulator 20, in the longitudinal direction of the linear image may be substantially uniform within an effective range of the one-dimensional spatial modulator 20.

The one-dimensional spatial modulator 20 is formed by, for example, a GLV (a grating light valve). The GLV is composed of a one-dimensional parallel arrangement of many movable and fixed gratings alternating with each other. The movable grating and the fixed grating include a reflecting surface shaped like a ribbon. The movable grating is adapted to shift in a predetermined direction in accordance with a control signal and thus modulate incident light.

The one-dimensional spatial modulator 20 may be formed by, for example, a DMD (a digital micromirror device). The DMD includes many micromirrors arranged on a substrate (e.g. a silicon substrate), each of which has a reflecting surface whose angle is changeable in accordance with a control signal. The DMD can control the modulation of incident light by controlling the angle of the reflecting surface of each micromirror.

The optical image-forming system 30 includes two lens groups 31 and 32, for example. When the GLV is used as the one-dimensional spatial modulator 20, a shade 33 for shielding zero-order light outputted from the GLV is provided between the first and second groups 31 and 32 of the optical image-forming system 30.

A fiber array light source, for example, can be used as the light source 11 for use in the exposure head 2, and more specifically, the fiber array light source includes a plurality of optical fibers each having an input end for inputting laser light and an output end for outputting the inputted laser light, and the output ends of the optical fibers are arranged in an array. In this case, it is desirable that the output ends of a plurality of optical fibers be arranged in a one-dimensional array, particularly when the one-dimensional spatial modulator 20 such as the GLV is used. When a two-dimensional spatial modulator 80 (see FIGS. 25A and 25B) such as the DMD is used as in the case of, in particular, an exposure head 3 of a third embodiment to be described later, the output ends of the optical fibers may be arranged in a two-dimensional array. The fiber array light source may use a plurality of semiconductor lasers to multiplex a plurality of laser light beams emitted from the semiconductor lasers so as to input the multiplexed laser light to each optical fiber (i.e., a configuration shown in FIG. 17 to be described later), or may use a single semiconductor laser having a plurality of light emitting points to multiplex a plurality of laser light beams emitted from the light emitting points so as to input the multiplexed laser light to each optical fiber (i.e., configurations shown in FIGS. 23 and 24 to be described later).

The above-described configuration of a multiplexing laser light source which multiplexes a plurality of laser light beams so as to input the multiplexed laser light to each optical fiber makes it possible to obtain light having high luminance and high output, thereby achieving performance suitable for exposure. Moreover, only a small number of optical fibers to be arrayed is needed, so that the light source can be implemented at low cost. Furthermore, the number of optical fibers can be reduced, so that a light emitting region of the array of optical fibers is reduced (that is, the luminance is expanded).

Figure 16:
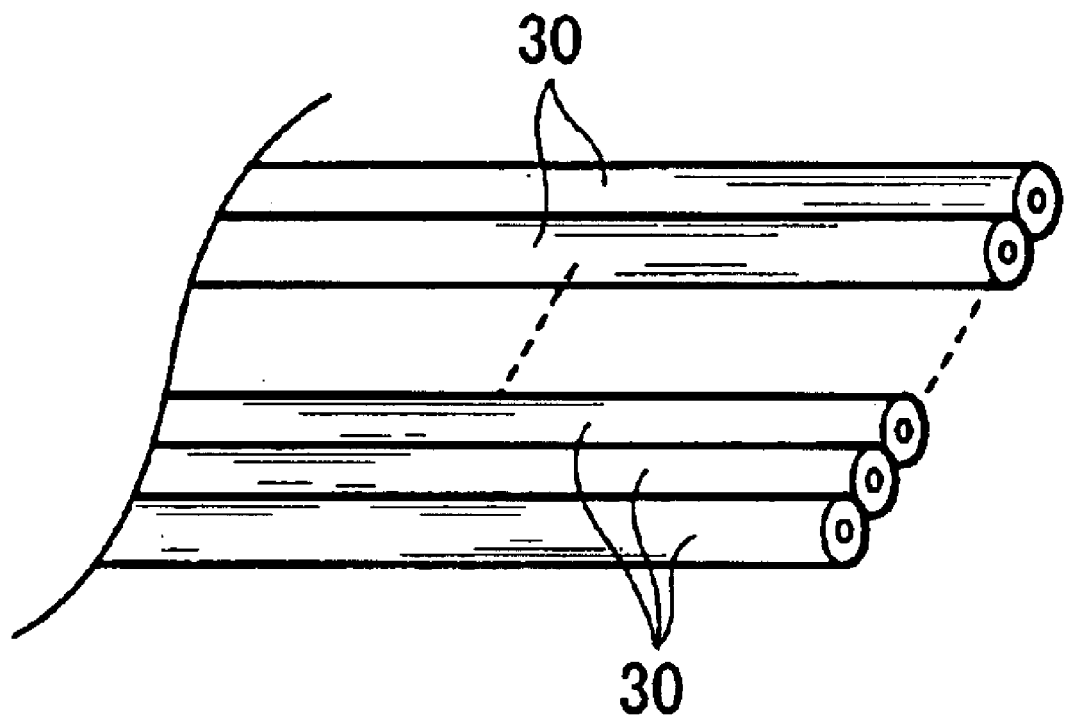
FIG. 16 is an illustration showing the structure of an output end of a fiber array light source.

When the fiber array light source is used as the light source 11 for the exposure head 2, a plurality of multimode fibers 30 (e.g. 25 multimode fibers 30) each having a cladding diameter of 60 μm and a core diameter of 25 μm, for example, are arranged in close proximity in the direction in which a linear image is formed so as to use light flux emitted from the respective end surfaces of the multimode fibers 30, as shown in FIG. 16. Seven semiconductor lasers, for example, are connected to an input end of each multimode fiber 30, although the specific configuration thereof will be described later. A cross-sectional profile of light flux emitted from the fiber array light source having a close arrangement of the multimode fibers 30 thus configured is, for example, substantially circular as a whole, and the light intensity distribution in the cross section is substantially uniform. By referring to an example 2 to be described later, the description will be given with regard to an example in which the above-mentioned fiber array light source is used as the light source 11.

When one semiconductor laser is connected to an input end of a single-mode fiber, the light intensity distribution of light flux emitted from the fiber is the Gaussian distribution. The second embodiment may be applied to this case.

For example, when the core diameter of the multimode fiber is reduced so that the configuration of the multimode fiber approaches that of the single-mode fiber, the light intensity distribution is an intermediate distribution between a uniform distribution and the Gaussian distribution. The second embodiment may be applied to this case.

A smaller size of a light emitting part of the light source 11 yields more nearly parallel light flux emitted from the optical correcting system 13 for correcting light intensity distribution, and thus allows the realization of the exposure head 2 having a greater focal depth. Desirably, the number of semiconductor lasers to be inputted to one fiber is expanded and the cladding diameter of the fiber is reduced in order to achieve the light intensity required for the exposure head 2 and reduce the size of the light emitting part. By referring to the example 2 to be described later, the description will be given with regard to an example in which an optical fiber has a cladding diameter of φ60 μm although a general optical fiber has a cladding diameter of φ125 μm.

Moreover, the light source may be configured to input light flux emitted from 14 semiconductor lasers to each of the multimode fibers each having a core diameter of 50 μm and an NA (a numerical aperture) equal to 0.2. Although a thin cladding portion causes a decrease in the efficiency of propagation of light through the fiber, there is no practical problem so long as the fiber has a core diameter of φ50 μm or less relative to a cladding diameter of 60 μm when light has a wavelength of 400 nm. Therefore, a preferred condition for the exposure head 2 of the second embodiment is that the core diameter is equal to or less than φ50 μm.

When the two-dimensional spatial modulator is used, it is preferable that the light source have the configuration of a fiber array or a fiber bundle and thus have the light emitting part of small size.

A laser array light source, not the fiber array light source, may be used as the light source 11 for use in the exposure head 2. The laser array light source may be configured to include a plurality of semiconductor lasers each having "a single output end" which serves as a light emitting point, whose output ends are arranged in a predetermined direction (i.e., a configuration shown in FIG. 21 to be described later), or may be configured to include a plurality of multi-cavity lasers arranged in a predetermined direction, each of which has a plurality of output ends which serve as light emitting points and are arranged in a predetermined direction (i.e., a configuration shown in FIGS. 22A and 22B to be described later). The light intensity distribution of light flux emitted from the above-mentioned laser array light source in the cross section thereof is, for example, the Gaussian distribution, which exhibits a high light intensity at the midsection and a low light intensity at the peripheral.

Next, the configuration of the light source 11 will be more specifically described.

Figure 17:
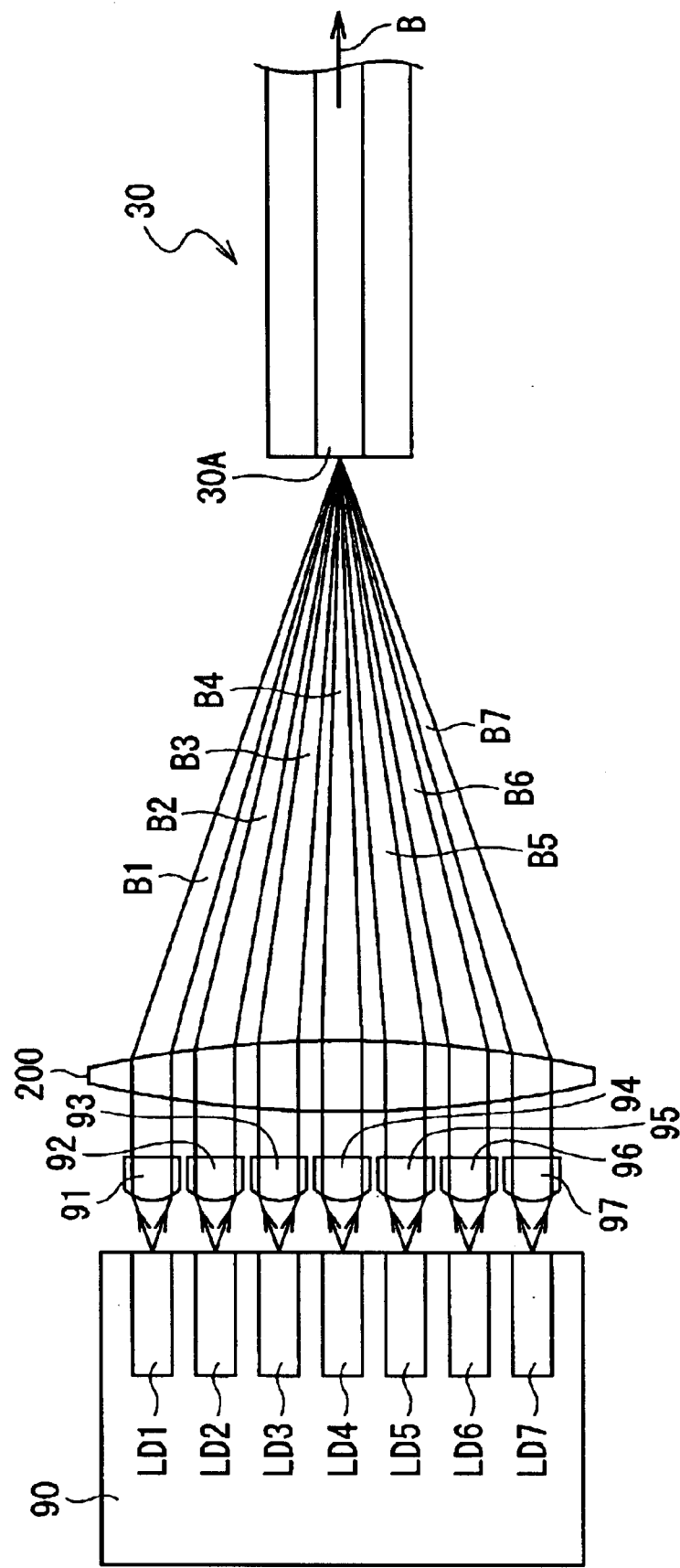
FIG. 17 is a configuration diagram showing an example of an optical correcting system of a fiber light source constituting the fiber array light source.

Firstly, the description is given with regard to an exemplary configuration of the fiber array light source using the multimode fibers 30, which is used as the light source 11. FIG. 17 shows the structure of the fiber array light source close to the input end of the multimode fiber 30. Close to the input end of each multimode fiber 30, there are arranged plural (e.g. seven) lateral multimode or single-mode GaN semiconductor lasers LD1 to LD7 in chip form which are arranged and fixed on a heat block 90, a plurality of collimator lenses 91 to 97 which are provided corresponding to the GaN semiconductor lasers LD1 to LD7, respectively, and a condenser lens 200 which condenses laser light beams collimated by the collimator lenses 91 to 97 so as to input the condensed laser light to an input end surface of a core 30A of the multimode fiber 30. One multiplexing laser light source (a fiber light source) is formed of the GaN semiconductor lasers LD1 to LD7, the collimator lenses 91 to 97, the condenser lens 200, and one multimode fiber 30. A parallel arrangement of a plurality of fiber light sources constitutes one fiber array light source.

All the GaN semiconductor lasers LD1 to LD7 have a common oscillation wavelength (e.g. 405 nm) and also have a common maximum output (for example, the multimode laser has a maximum output of 100 mW, or the single-mode laser has a maximum output of 30 mW). Incidentally, a GaN semiconductor laser having any oscillation wavelength other than 405 nm within a wavelength range of 350 nm to 450 nm may be used as each of the GaN semiconductor lasers LD1 to LD7.

Figure 18:
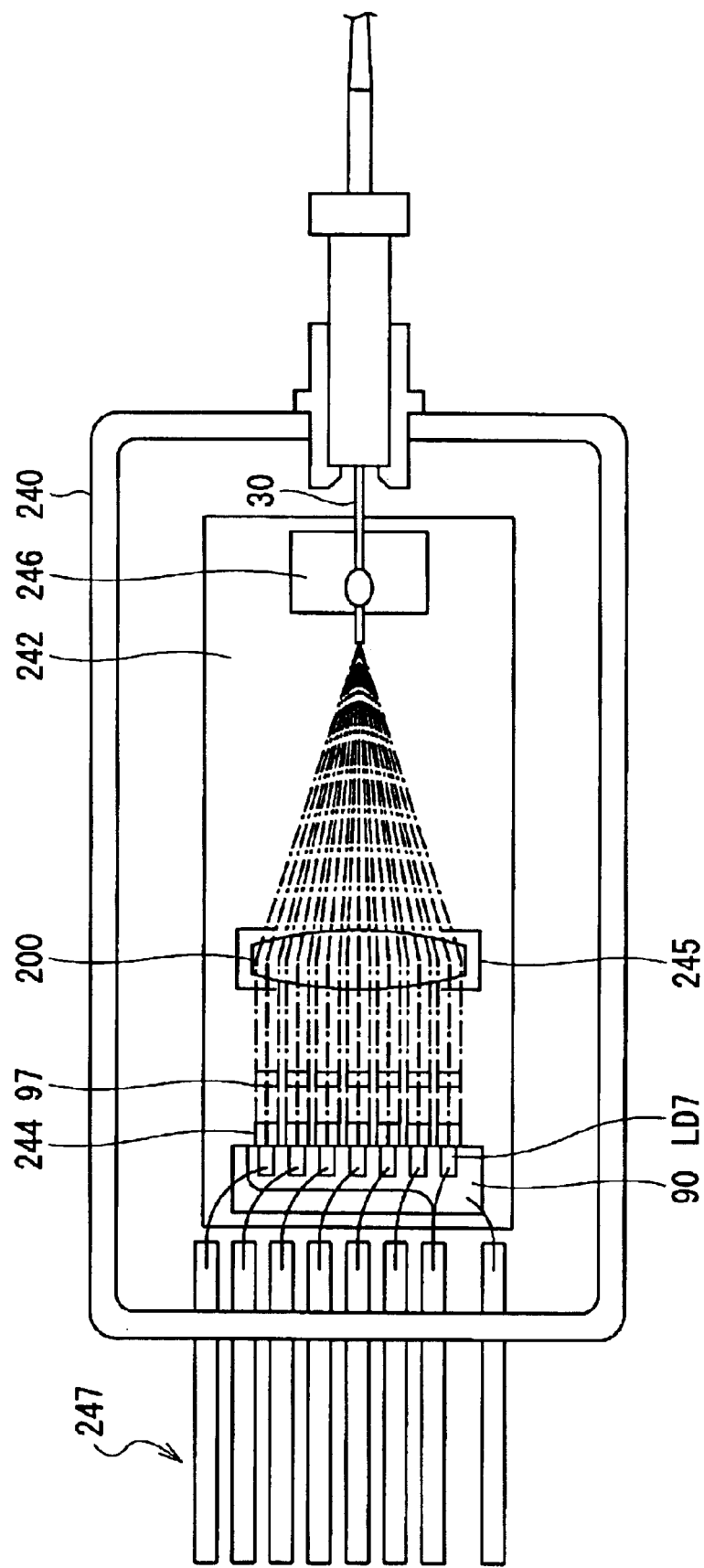
FIG. 18 is a plan view showing the structure of the fiber light source.
Figure 19:
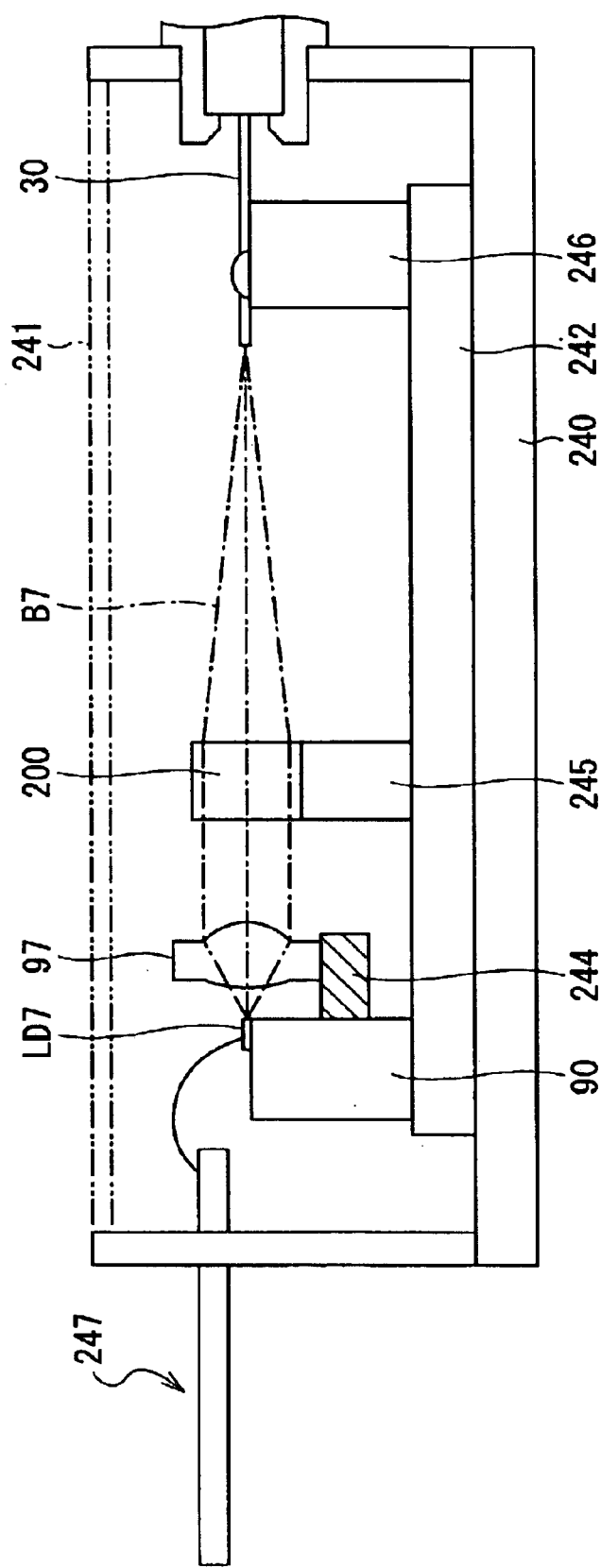
FIG. 19 is a plan view showing the structure of the fiber light source.

Each fiber light source is contained in conjunction with other optical elements in a box-shaped package 240 having an opening at its top, as shown in FIGS. 18 and 19. The opening of the package 240 is closed with a package lid 241, as shown in FIG. 19. The fiber light source is hermetically sealed in an enclosed space (a sealed space), which is provided through a procedure which involves degassing the package 240, then introducing a sealing gas into the package 240, and then closing the opening with the package lid 241.

A base plate 242 is fixed on a bottom surface of the package 240. On a top surface of the base plate 242, mounted are the heat block 90, a condenser lens holder 245 which holds the condenser lens 200, and a fiber holder 246 which holds an input end portion of the multimode fiber 30. An output end portion of the multimode fiber 30 is drawn out of the package 240 through an opening bored in a wall surface of the package 240.

Moreover, a collimator lens holder 244 is mounted on a side surface of the heat block 90 and holds the collimator lenses 91 to 97. An opening is bored in a sidewall surface of the package 240, and a wiring 247 for feeding a driving current to the GaN semiconductor lasers LD1 to LD7 is drawn out of the package 240 through the opening.

To avoid the complexity of FIG. 19, the GaN semiconductor laser LD7 and the collimator lens 97 alone, which are one of a plurality of GaN semiconductor lasers LD1 to LD7 and one of a plurality of collimator lenses 91 to 97, respectively, are designated by their reference numerals and shown in FIG. 19.

Figure 20:
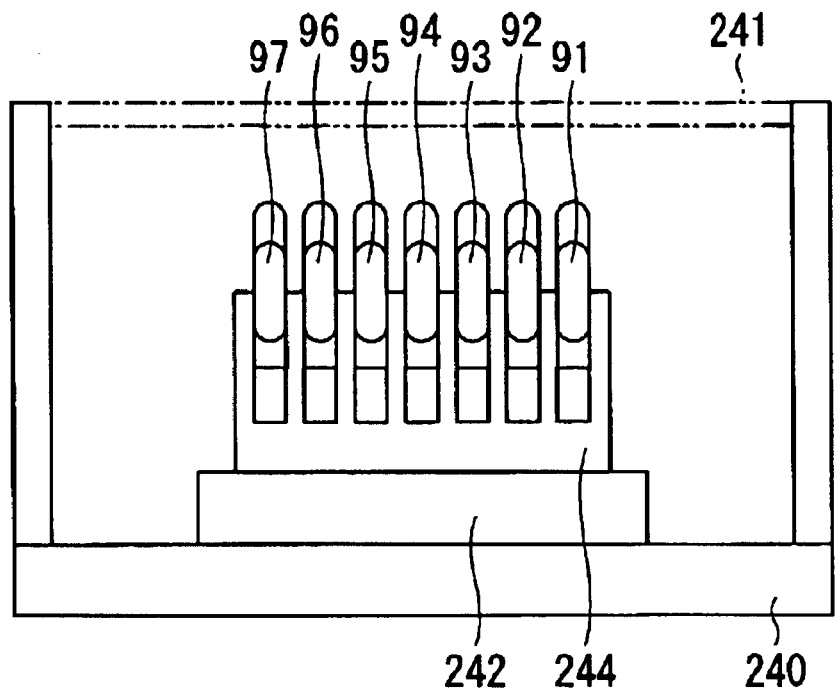
FIG. 20 is a plan view showing the structure of the fiber light source

FIG. 20 shows a front view of a part in which the collimator lenses 91 to 97 are mounted. Each of the collimator lenses 91 to 97 is shaped in the following manner: a circular lens having an aspheric surface is cut into a strip on a flat surface which is parallel to its optical axis and is included in a region including its optical axis. The strip-shaped collimator lenses 91 to 97 can be formed by molding optical plastics or optical glass, for example. The collimator lenses 91 to 97 are arranged in such a manner that the longitudinal direction thereof is perpendicular to the direction in which the light emitting points of the GaN semiconductor lasers LD1 to LD7 are arranged (i.e., the direction across the drawing of FIG. 20). Moreover, adjacent ones of the collimator lenses 91 to 97 are closely arranged in the direction in which the light emitting points of the GaN semiconductor lasers LD1 to LD7 are arranged.

For instance, GaN semiconductor lasers, which each include an active layer having a light emitting width of 2 μm and emit laser beams B1 to B7 each having an angle of divergence of, for example, 10 degrees in the direction parallel to the active layer and an angle of divergence of, for example, 30 degrees in the direction perpendicular thereto, are used as the GaN semiconductor lasers LD1 to LD7. The GaN semiconductor lasers LD1 to LD7 are arranged in such a manner that the light emitting points thereof are aligned in a line in the direction parallel to the active layer. Therefore, the laser beams B1 to B7 emitted from the light emitting points enter into the strip-shaped collimator lenses 91 to 97, respectively, with the direction having a large angle of divergence matching the longitudinal direction and the direction having a small angle of divergence matching the width direction (i.e., the direction perpendicular to the longitudinal direction), as described above.

As described above, the fiber array light source having an array of fiber light sources, one each of which includes a plurality of GaN semiconductor lasers LD1 to LD7, can be used as the light source 11. The fiber array light source having an array of fiber light sources, one each of which includes only a single semiconductor laser, may be used as the light source 11. In this case, in each fiber light source, laser light emitted from the single semiconductor laser having one light emitting point is inputted to one optical fiber and is outputted from the optical fiber through the output end thereof.

Figure 21:
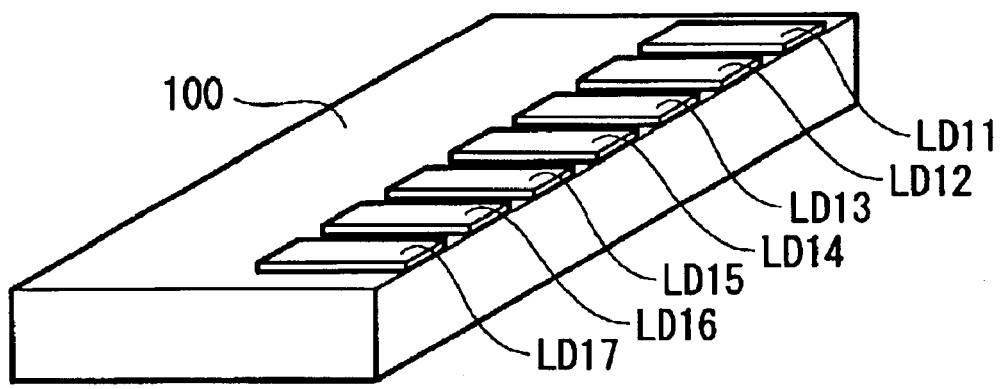
FIG. 21 is a configuration diagram showing an example of a laser array light source.

The laser array light source having an array of semiconductor lasers may be used as the light source 11 without the use of the multimode fiber 30. For example, a laser array light source having a parallel arrangement of plural (e.g. seven) chip-form semiconductor lasers LD11 to LD17 on a heat block 100 can be used as the laser array light source, as shown in FIG. 21.

Figure 22A:
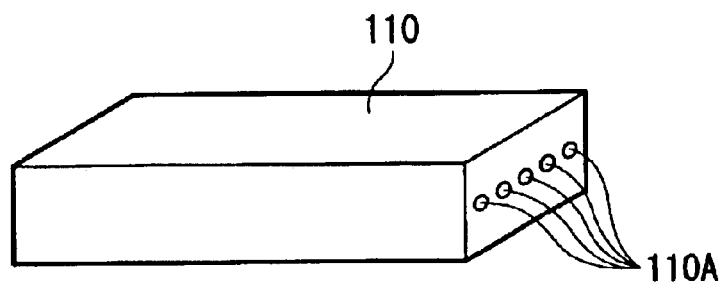
FIGS. 22A and 22B are configuration diagrams showing another example of the laser array light source.
Figure 22B:
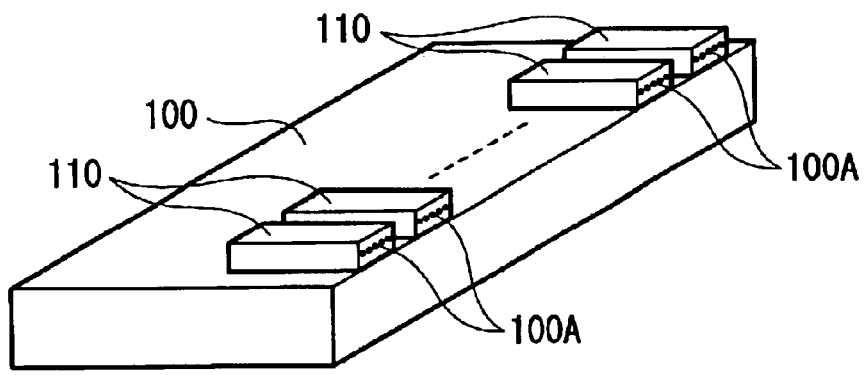

As shown in FIG. 22B, a multi-cavity laser array having a parallel arrangement of a plurality of multi-cavity lasers 110 on the heat block 100 may be used as the light source 11. The multi-cavity laser 110 has plural (e.g. five) light emitting points 110A arranged in a predetermined direction, as shown in FIG. 22A. In the multi-cavity laser array, a plurality of multi-cavity lasers 110 are arranged in parallel in the same direction as the direction in which the light emitting points 110A are arranged.

In the fiber array light source, laser light to be inputted to each optical fiber is not limited to laser light into which laser light beams emitted from a plurality of chip-form GaN semiconductor lasers LD1 to LD7 are multiplexed.

Figure 23:
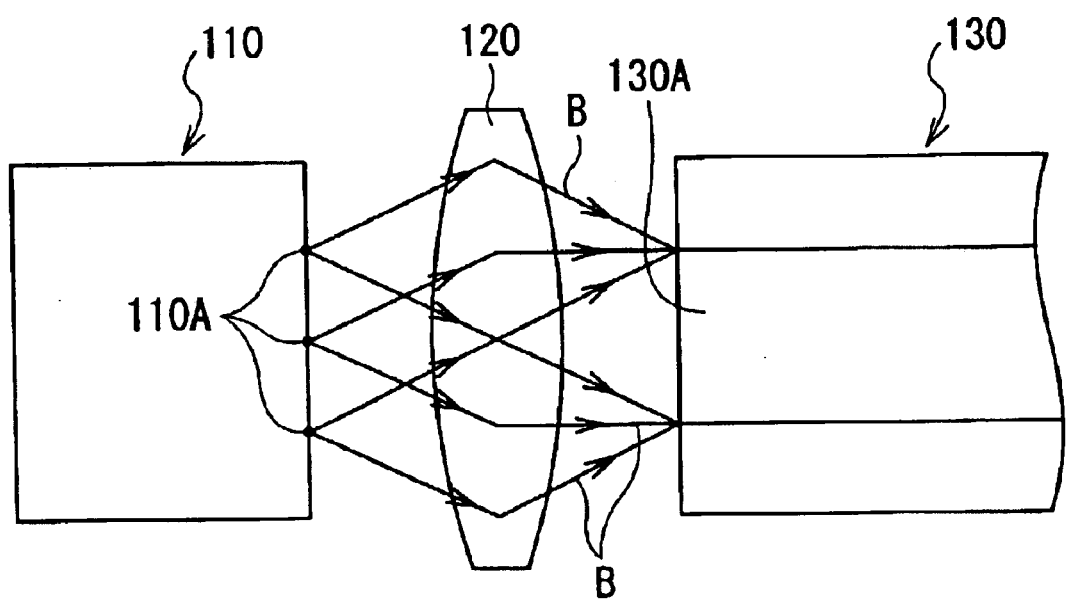
FIG. 23 is a configuration diagram showing another example of the fiber light source.

For example, as shown in FIG. 23, one multi-cavity laser 110 having plural (e.g. three) light emitting points 110A may be used to multiplex laser light beams emitted from the light emitting points 110A. In this case, each fiber light source comprises one multi-cavity laser 110, a condenser lens 120, and one multimode fiber 130. A parallel arrangement of a plurality of fiber light sources constitutes one fiber array light source. The multi-cavity laser 110 can be formed by a GaN laser diode having an oscillation wavelength of 405 nm, for example.

In the fiber light source having the above-described configuration, the laser beams B emitted from a plurality of light emitting points 110A of the multi-cavity laser 110 are condensed by the condenser lens 120 and then enter into a core 130A of the multimode fiber 130. After entering into the core 130A, the laser light beams propagate through the fiber and are multiplexed into one laser light beam, which is then outputted from the fiber through the output end thereof.

In the fiber light source having the above-described configuration, a plurality of light emitting points 110A of the multi-cavity laser 110 are arranged within a width approximately equal to a core diameter of the multimode fiber 130, and a convex lens having a focal length approximately equal to the core diameter of the multimode fiber 130 or a rod lens which collimates beams emitted from the multi-cavity laser 110 in only a surface perpendicular to the active layer of the laser is used as the condenser lens 120. This makes it possible to improve the efficiency of coupling of the laser beams B to the multimode fiber 130.

Figure 24:
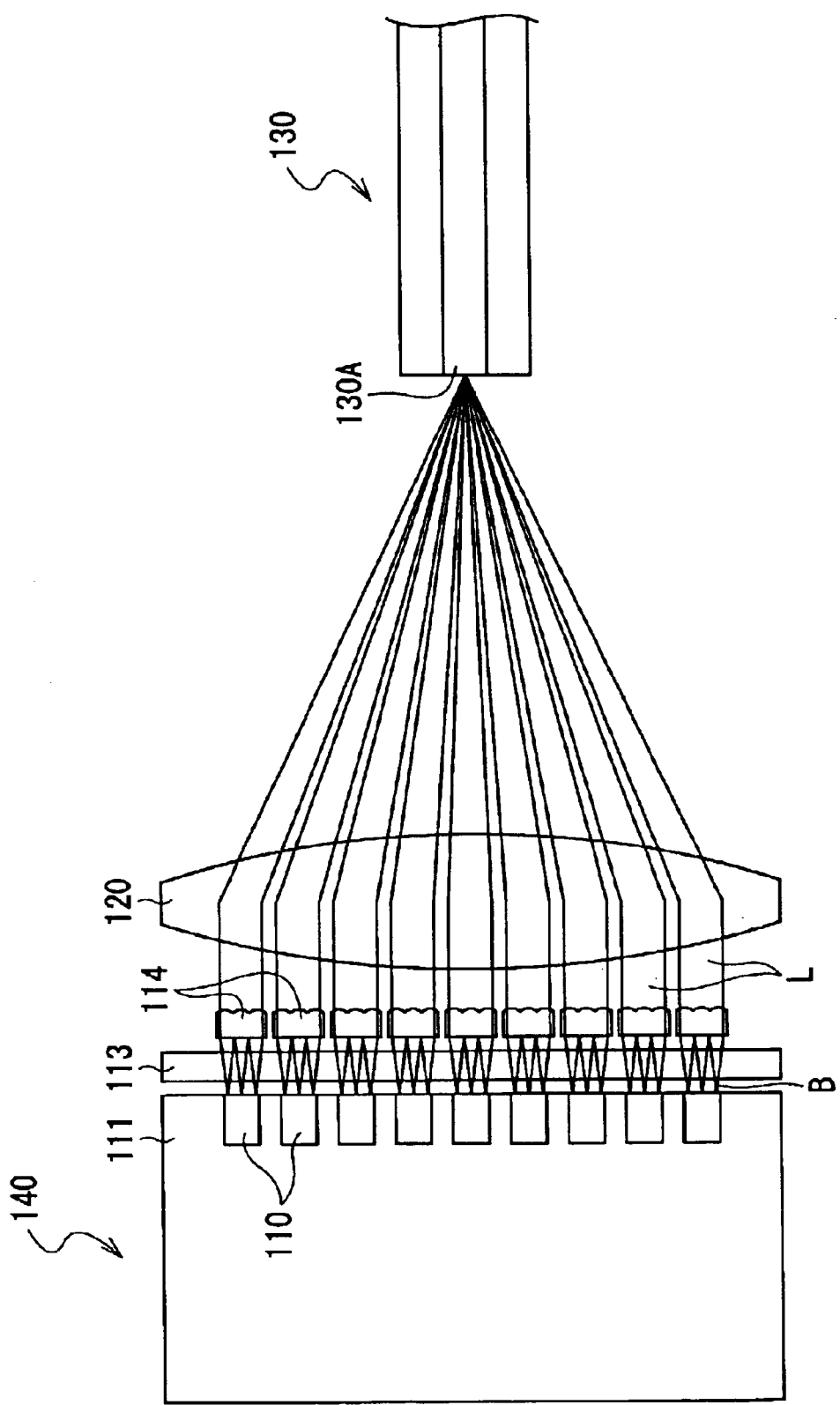
FIG. 24 is a configuration diagram showing still another example of the fiber light source.

As shown in FIG. 24, a laser array 140 having an equidistant arrangement of plural (e.g. nine) multi-cavity lasers 110 on a heat block 111 may be used as each fiber light source. A plurality of multi-cavity lasers 110 are arranged in the same direction as the direction in which the light emitting points 110A of each chip are arranged, and the multi-cavity lasers 110 are fixed on the heat block 111.

In this case, each fiber light source comprises the laser array 140 having a plurality of multi-cavity lasers 110, a lens array 114 having an arrangement of a plurality of microlenses corresponding to the multi-cavity lasers 110, one rod lens 113 located between the laser array 140 and the lens array 114, the condenser lens 120, and one multimode fiber 130. A parallel arrangement of a plurality of fiber light sources constitutes one fiber array light source.

In the fiber light source, the laser beams B emitted from a plurality of light emitting points 110A of a plurality of multi-cavity lasers 110 are condensed in a predetermined direction by the rod lens 113 and then collimated by the microlenses of the laser array 140. Collimated laser beams L are condensed by the condenser lens 120 and then enter into the core 130A of the multimode fiber 130. After entering into the core 130A, the laser light beams propagate through the fiber and are multiplexed into one laser light beam, which is then outputted from the fiber through the output end thereof.

A laser module may be constituted by the fiber light source contained in a casing out of which an output end portion of the multimode fiber 130 is drawn.

Next, the description is given with regard to the function and operation of the exposure head 2.

In the exposure head 2, light flux emitted from the light source 11 are collimated by the function of collimator lens 12, and the collimated light flux enter into the optical correcting system 13 for correcting light intensity distribution. The optical correcting system 13 for correcting light intensity distribution changes the width of the light flux at the exit position at which each of the collimated light flux exits so that the light intensity distribution of a linear image may be substantially uniform when the collimated light flux are formed into the linear image.

For example, when the fiber array light source shown in FIG. 16 or the like is used as the light source 11, the cross-sectional profile of light flux emitted from the light source is substantially circular as a whole. Thus, when the light flux are formed into a linear image as they are, the linear image has a high light intensity at its midsection and a low light intensity at its peripheral. The optical correcting system 13 for correcting light intensity distribution corrects the light intensity distribution by increasing the width of the light flux at the midsection and reducing the width of the light flux at the peripheral.

For example, when the laser array light source or the like is used as the light source 11, the light intensity distribution of light flux emitted from the light source is generally the Gaussian distribution. Thus, when the light flux are formed into a linear image as they are, the linear image has a higher light intensity at its midsection and a lower light intensity at its peripheral, as compared to the linear image formed by using the fiber array light source. In this case, the optical correcting system 13 for correcting light intensity distribution performs correction which involves further increasing the width of the light flux at the midsection and further reducing the width of the light flux at the peripheral, compared to the correction which takes place when the fiber array light source is used.

The optical condensing system 14 condenses the light flux from the optical correcting system 13 for correcting light intensity distribution in only one direction so as to form a linear image on the one-dimensional spatial modulator 20. Under the control of an exposure control circuit (not shown), the one-dimensional spatial modulator 20 modulates the linear image in accordance with a control signal generated according to an exposure pattern of the circuit. When the GLV is used as the one-dimensional spatial modulator 20, zero-order light of modulated light is shielded by the shade 33 provided between the first and second groups 31 and 32 of the optical image-forming system 30. First-order light is not shielded by the shade 33 but, is used for exposure. The optical image-forming system 30 forms the modulated light flux from the one-dimensional spatial modulator 20 into an image on the exposure surface 40. The optical image-forming system 30 forms the image in such a manner that a linear-image-formed surface on the one-dimensional spatial modulator 20 and the exposure surface 40 are conjugate. Accordingly, an exposed image on the exposure surface 40 has a substantially uniform light intensity distribution in the same manner as the linear image formed on the one-dimensional spatial modulator 20. The exposure head 2 can also perform two-dimensional exposure by, for example, moving the exposure surface 40 in the direction perpendicular to the linear image.

As described above, according to the exposure head 2 of the second embodiment, the optical correcting system 13 for correcting light intensity distribution forms a linear image having a substantially uniform light intensity distribution on the one-dimensional spatial modulator 20 so as to use the linear image for exposure, and therefore, excellent exposure can be performed without reducing the efficiency of use of light of the whole optical correcting system.

Third Embodiment

Although the description has been given with regard to a method for making the light intensity distribution of a one-dimensional linear image substantially uniform by referring to the above-mentioned first embodiment, the method for uniformalizing the light intensity distribution may be applied to a method for making the light intensity distribution of two-dimensional light flux such as illuminating light substantially uniform. By referring to the third embodiment, the description is given with regard to the method for uniformalizing the light intensity distribution, which is applied to an exposure head using a two-dimensional spatial modulator.

Figure 25A:
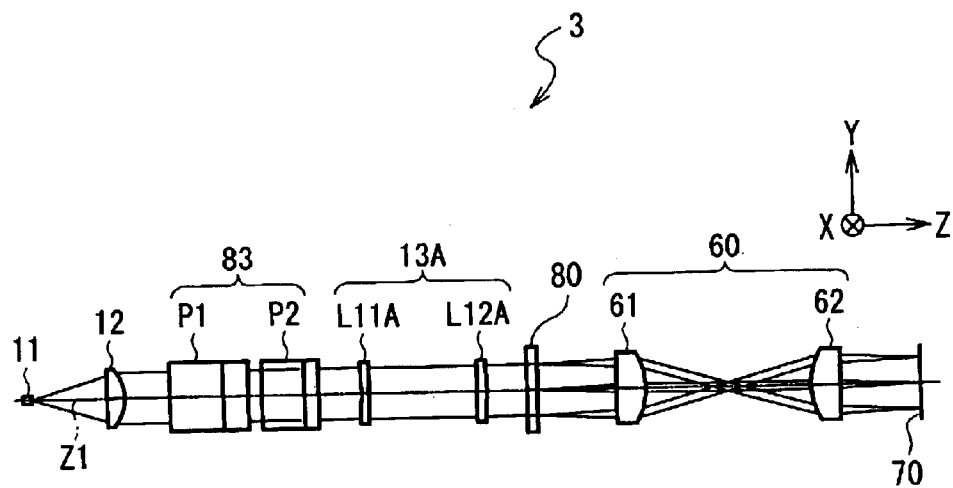
FIGS. 25A and 25B are optical correcting system arrangement diagrams showing an exemplary configuration of an exposure head according to a third embodiment of the invention.
Figure 25B:
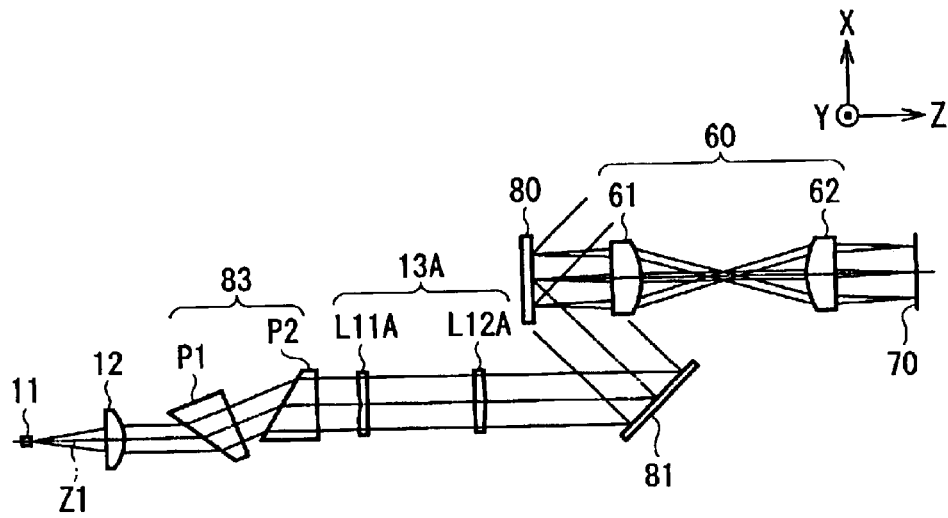

FIGS. 25A and 25B show an exemplary configuration of an exposure head according to the third embodiment of the invention. FIGS. 25A and 25B show the configuration of the exposure head in cross sections perpendicular to each other.

The exposure head 3 comprises the two-dimensional spatial modulator 80 such as the DMD. The exposure head 3 also comprises the light source 11, the collimator lens 12 which collimates light flux emitted from the light source 11 so as to use the collimated light flux as illuminating light for illuminating the two-dimensional spatial modulator 80 that is a surface to be illuminated, an anamorphic prism 83 which expands the width of the illuminating light flux from the collimator lens 12, an optical correcting system 13A for correcting light intensity distribution which corrects the light intensity distribution (i.e., an illuminance distribution) of the illuminating light, and a reflecting mirror 81 which reflects the corrected illuminating light toward the two-dimensional spatial modulator 80, and these components are arranged in sequence in the direction in which light flux travel along the optical axis Z1. The exposure head 3 further comprises an optical image-forming system 60 which forms the modulated light flux from the two-dimensional spatial modulator 80 into an image on an exposure surface 70.

In the third embodiment, the light source 11, the collimator lens 12 and the optical correcting system 13A for correcting light intensity distribution correspond to "an optical lighting system for correcting light intensity distribution" of the invention.

The laser array light source having an array of semiconductor lasers, for example, is used as the light source 11. The light intensity distribution of light flux emitted from the laser array light source in the cross section thereof is generally the Gaussian distribution, which exhibits a high light intensity at the midsection and a low light intensity at the peripheral. The fiber array light source may be used as the light source 11. The configurations of the laser array light source and the fiber array light source are the same as the configurations thereof described by referring to the above-mentioned second embodiment.

The anamorphic prism 83 is formed by, for example, two prisms P1 and P2 so as to magnify the illuminating light from the collimator lens 12 according to an effective region of the two-dimensional spatial modulator 80. In an example shown in FIGS. 25A and 25B, the anamorphic prism 83 expands the width of the light flux in one direction (i.e., the X-direction in FIGS. 25A and 25B).

The optical correcting system 13A for correcting light intensity distribution is formed by, for example, two aspherical lenses L11A and L12A. The optical correcting system 13A for correcting light intensity distribution has power in not only a specific direction but also all directions, as distinct from the optical correcting system 13 for correcting light intensity distribution of the above-described first and second embodiments. The optical correcting system 13A for correcting light intensity distribution has the function of increasing the width of an incoming light flux at the midsection and reducing the width of an incoming light flux at the peripheral so that the light intensity on the two-dimensional spatial modulator 80 may be substantially uniform within an effective range.

The optical image-forming system 60 includes, for example, two lens groups 61 and 62, and is adapted to form modulated light from the two-dimensional spatial modulator 80 into an image on the exposure surface 70 in such a manner that the two-dimensional spatial modulator 80 and the exposure surface 70 are conjugate.

In the exposure head 3, light flux emitted from the light source 11 are collimated for use in illumination by the function of the collimator lens 12, then the width of the collimated light flux is expanded by the anamorphic prism 83 according to the effective range of the two-dimensional spatial modulator 80, and thereafter the collimated light flux enter as illuminating light into the optical correcting system 13A for correcting light intensity distribution. The optical correcting system 13A for correcting light intensity distribution changes the width of the light flux at the exit position at which each of the collimated light flux exits so that the light intensity distribution of the illuminating light may be substantially uniform on the two-dimensional spatial modulator 80 that is the surface to be illuminated.

For example, when the laser array light source is used as the light source 11, the light intensity distribution of light flux emitted from the light source is generally the Gaussian distribution, and thus the optical correcting system 13A for correcting light intensity distribution performs correction which involves increasing the width of the light flux at the midsection and reducing the width of the light flux at the peripheral. The two-dimensional spatial modulator 80 is illuminated by the corrected illuminating light.

Under the control of an exposure control circuit (not shown), the two-dimensional spatial modulator 80 modulates the illuminating light in accordance with a control signal generated according to an exposure pattern of the circuit. The optical image-forming system 60 forms the modulated light flux from the two-dimensional spatial modulator 80 into an image on the exposure surface 70. Since the two-dimensional spatial modulator 80 and the exposure surface 70 are conjugate, the modulated light based on illumination having a uniform light intensity distribution is formed into the image on the exposure surface 70, and therefore, two-dimensional exposure is excellently performed.

As described above, according to the exposure head 3 of the third embodiment, the two-dimensional spatial modulator 80 is illuminated by illuminating light whose light intensity distribution is made substantially uniform by the optical correcting system 13A for correcting light intensity distribution, thereby performing exposure. Therefore, excellent two-dimensional exposure can be performed without reducing the efficiency of use of light of the whole optical correcting system.

EXAMPLES

Next, the description is given with regard to specific examples corresponding to the above-described embodiments.

Example 1

Examples 1-1 to 1-3

Firstly, the description is given with regard to the one-dimensional optical condensing system (examples 1-1 and 1-2) corresponding to the first embodiment and the optical lighting system for correcting light intensity distribution (an example 1-3) corresponding to the third embodiment.

<Example 1-1>

In the example 1-1, the fiber array light source or the like is used as the light source 11, the cross-sectional profile of light flux emitted from the light source is substantially circular as a whole, the light intensity distribution of the light flux in the cross section thereof is substantially uniform, and the circular light flux are formed into a linear image.

Figure 3A:
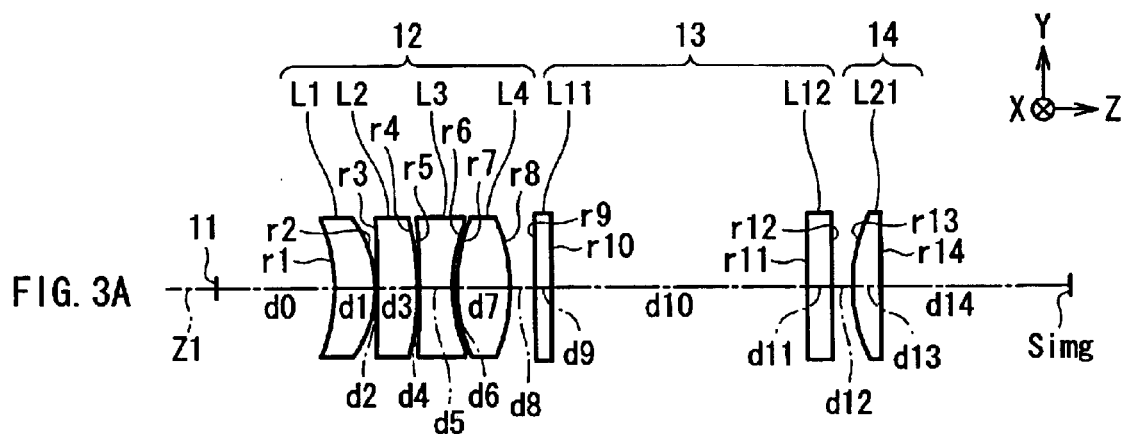
FIGS. 3A and 3B are optical correcting system arrangement diagrams of a one-dimensional optical condensing system according to an example 1-1.
Figure 3B:
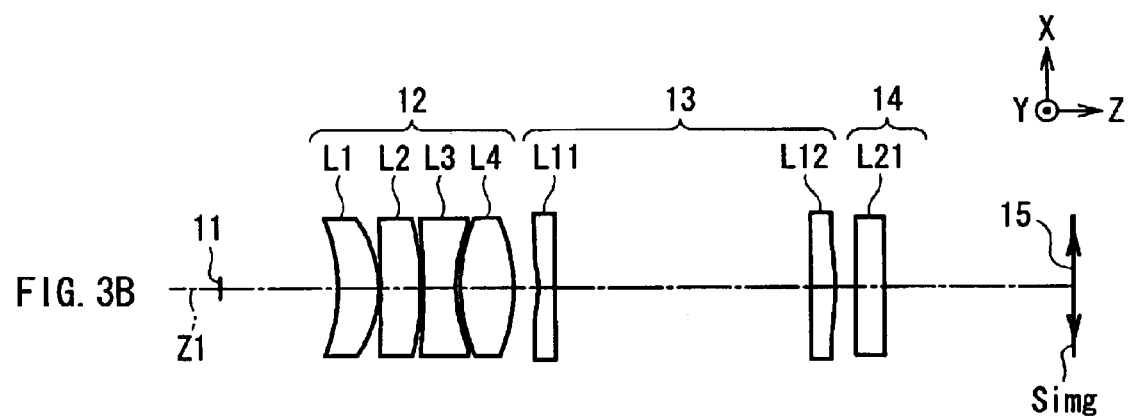
Figure 4A:
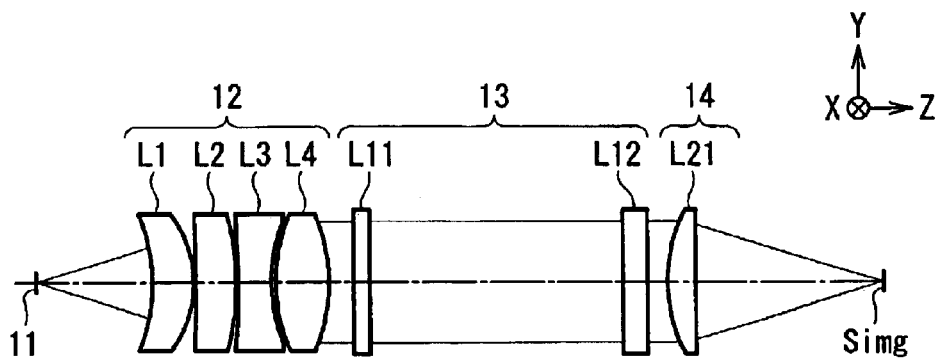
FIGS. 4A and 4B are optical correcting system arrangement diagrams showing the configuration of the one-dimensional optical condensing system according to the example 1-1 in conjunction with an optical path.
Figure 4B:
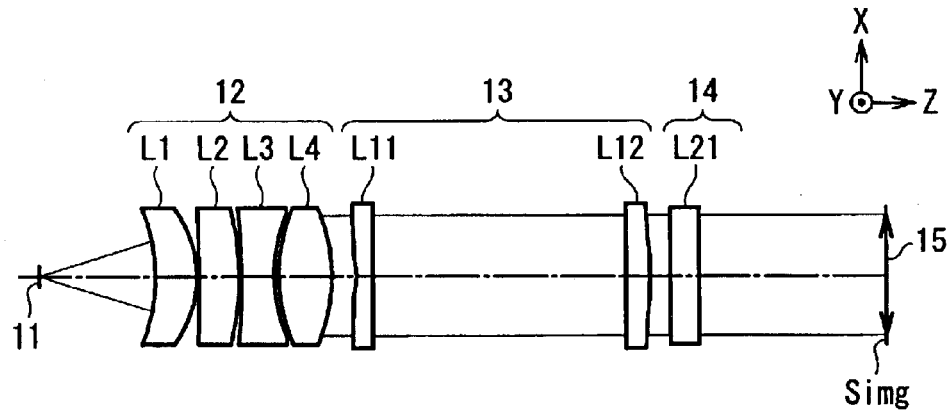

FIGS. 3A and 3B show the configuration of the one-dimensional optical condensing system according to the example 1-1. FIGS. 4A and 4B show an optical path of a light flux passing through an outermost side of the one-dimensional optical condensing system. FIGS. 3B and 4B show a cross section of the system viewed in the direction in which a linear image is formed, and FIGS. 3A and 4A show a cross section of the system viewed in the direction perpendicular to the cross section shown in FIGS. 3B and 4B. In FIG. 3A, reference symbol ri indicates a curvature radius of an ith surface of each structural component (i=0, . . . , 14), and reference symbol di indicates a distance between an ith surface and an (i+1)th surface on the optical axis. The reference symbols ri and di have numeral i which is incremented in sequence in the direction in which light flux travel, provided that the light source 11 is assumed as a 0th surface.

The one-dimensional optical condensing system comprises the light source 11, the collimator lens 12, the optical correcting system 13 for correcting light intensity distribution, and the optical condensing system 14, which are arranged in sequence in the direction in which light flux travel along the optical axis Z1. The collimator lens 12 is composed of four lenses L1 to L4, which are arranged in this sequence when viewed on the side of the light source 11. The optical correcting system 13 for correcting light intensity distribution is composed of two lenses L11 and L12 having refractive power in only the longitudinal direction of the linear image 15 (i.e., the X-direction in FIGS. 3A and 3B), which are arranged in this sequence when viewed on the side of the light source 11. The optical condensing system 14 is composed of one cylindrical lens L21 having power in only the direction perpendicular to the linear image 15 (i.e., the Y-direction in FIGS. 3A and 3B).

FIGS. 5A and 5B show specific lens data of the one-dimensional optical condensing system shown in FIGS. 3A and 3B. In the column "Si" indicative of a surface number Si included in reference lens data shown in FIG. 5A, presented are the numbers of surfaces of each component, each of which has numeral i which is incremented in sequence in the direction in which light flux travel, provided that the light source 11 is assumed as the 0th surface. The values of the surfaces corresponding to the reference symbols ri and di in FIG. 3A are presented in the columns "rhi" and "rvi" indicative of the curvature radius ri and the column "di" indicative of the distance di between surfaces. The values of the curvature radius ri and the distance di between surfaces are expressed in the unit millimeter (mm). In the column "Ni", presented are the values of refractive indices relative to a wavelength of 405 nm of an ith optical element.

As the curvature radius ri, provided are the curvature radius rhi in the longitudinal direction of the linear image 15 (i.e., the X-direction in FIGS. 3A and 3B) and the curvature radius rvi in the direction perpendicular to the linear image 15 (i.e., the Y-direction in FIGS. 3A and 3B).

In the example 1-1, the curvature radius rh9, in the direction of the linear image, of an object-facing surface (i.e., a ninth surface) of the lens L11 of the optical correcting system 13 for correcting light intensity distribution and the curvature radius rh12, in the direction of the linear image, of an image-facing surface (i.e., a twelfth surface) of the lens L12 of the optical correcting system 13 exhibit aspheric surfaces. Moreover, the curvature radius rv13, in the direction perpendicular to the direction of the linear image, of an image-facing surface (i.e., a thirteenth surface) of the optical condensing system 14 exhibits an aspheric surface.

Aspheric surface data shown in FIG. 5B is coefficients in an equation which expresses the shape of the aspheric surface and is expressed as the following equation (A). In numeric values which are presented in FIG. 5B to express each aspheric surface, reference symbol "E" indicates that a numeric value following "E" is "an exponent" having a base 10 and indicates that a numeric value followed by "E" is multiplied by the numeric value expressed by an exponential function having the base 10. For example, "1.0E–02" refers to "1.0×10$^{-2}$".

$$Z = \frac{C \cdot \rho^2}{1 + \sqrt{1 - K \cdot (C \cdot \rho)^2}} + \sum_{i=3}^{10} ai \cdot \rho^i \quad (A)$$

where Z denotes a length of a perpendicular line drawn from a point on an aspheric surface situated at a height ρ relative to the optical axis to a tangent plane of a vertex of the aspheric surface (i.e., a plane perpendicular to the optical axis), and the length Z is expressed in the unit millimeter (mm), ρ denotes a distance from the optical axis, and the distance ρ is expressed in the unit millimeter (mm), K denotes a constant of cone, C denotes a paraxial curvature (1/r, where r denotes a paraxial curvature radius), and ai denotes an i-order aspheric surface coefficient (i=3, ..., 10).

Figure 6:
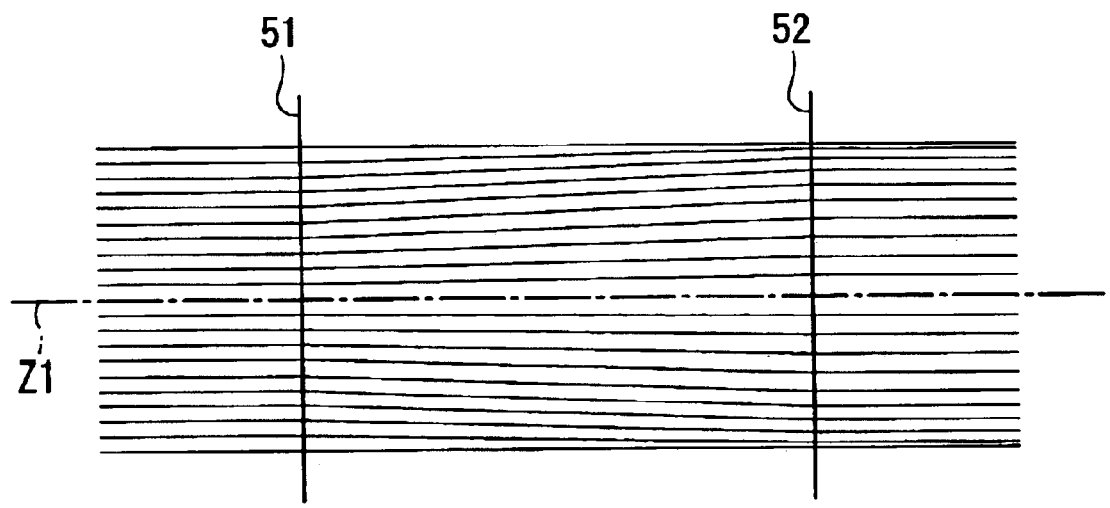
FIG. 6 is an illustration showing a change in light flux, which is made by an optical correcting system for correcting light intensity distribution of the example 1-1.

FIG. 6 shows a change in light flux entering into the optical correcting system 13 for correcting light intensity distribution. As shown in FIG. 6, the optical correcting system 13 for correcting light intensity distribution expands the width of the incoming light flux entering through the midsection and conversely reduces the width of the incoming light flux entering through the peripheral. Incidentally, the parts designated by numerals 51 and 52 virtually represent the entry plane and the exit plane of the optical correcting system 13 for correcting light intensity distribution, respectively.

Figure 7:
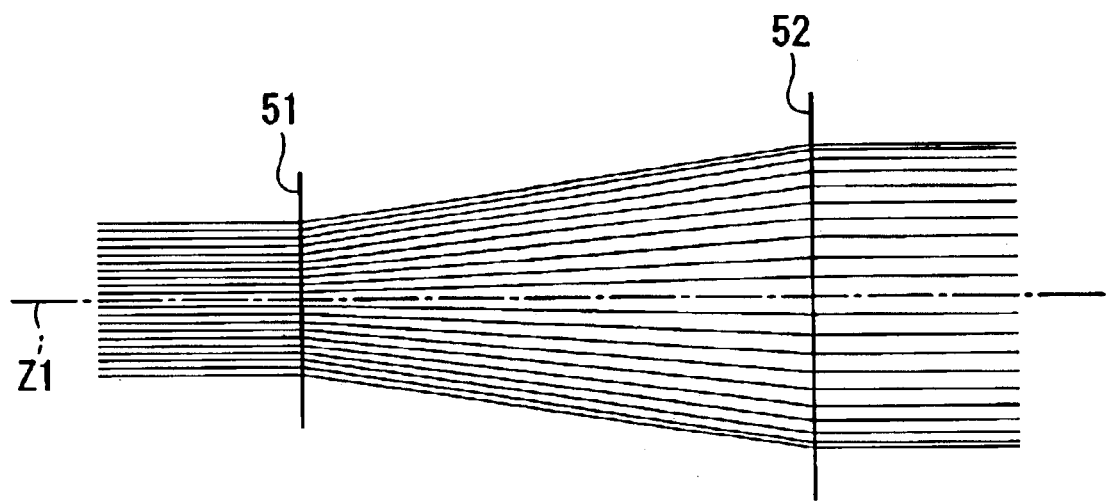
FIG. 7 is an illustration showing a change in light flux, which is made by an optical correcting system for correcting light intensity distribution which is configured to double the overall width of light flux.

For reference, in FIG. 7, there is shown a change in light flux which takes place in the optical correcting system 13 for correcting light intensity distribution which is configured to double the overall width of light flux so as to provide outgoing light flux having the doubled width, although specific lens data is omitted. Also in this case, the optical correcting system 13 for correcting light intensity distribution expands the width of the incoming light flux entering through the midsection and conversely reduces the width of the incoming light flux entering through the peripheral.

Figure 8:
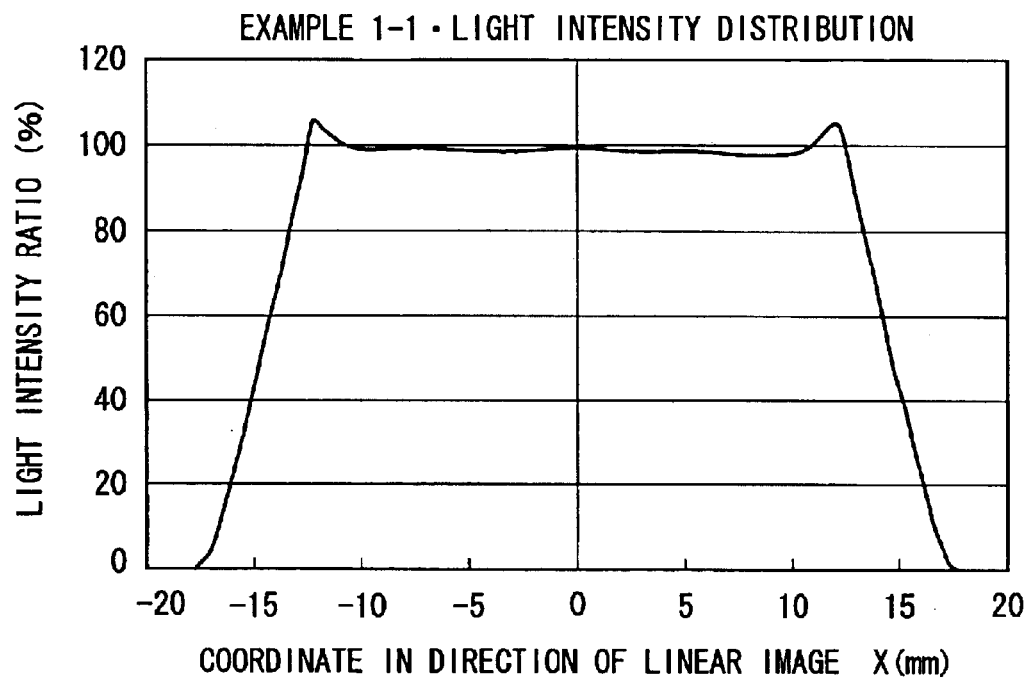
FIG. 8 is a plot showing a light intensity distribution obtained by the one-dimensional optical condensing system according to the example 1-1.

FIG. 8 shows the light intensity distribution of a linear image formed by the one-dimensional optical condensing system. In FIG. 8, the horizontal axis indicates the coordinate of the linear image in the direction in which the linear image is formed with respect to the optical axis, and the vertical axis indicates a light intensity ratio (%).

Figure 9:
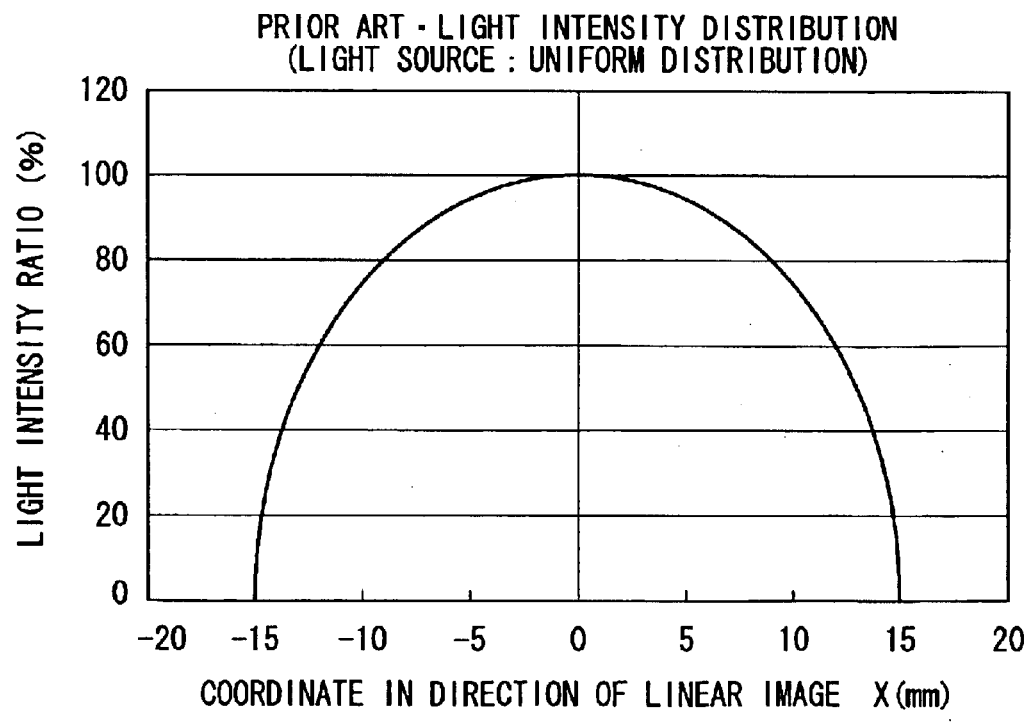
FIG. 9 is a plot showing a light intensity distribution obtained by a conventional one-dimensional optical condensing system.

As can be seen from FIG. 8, the optical correcting system of the example 1-1 can achieve a substantially uniform light intensity distribution without reducing the efficiency of use of light of the whole optical correcting system, compared to the light intensity distribution which is obtained by a conventional optical correcting system which does not correct the light intensity distribution (see FIG. 9).

<Example 1-2>

In the example 1-2, the laser array light source shown in FIG. 21 or the like is used as the light source 11, the light intensity distribution of light flux emitted from the light source in the cross section thereof is the Gaussian distribution, and the light flux having the Gaussian distribution are formed into a linear image.

The optical correcting system of the example 1-2 is the same as that of the example 1-1, except for lens data of the optical correcting system 13 for correcting light intensity distribution. Accordingly, only the lens data of the optical correcting system 13 for correcting light intensity distribution is shown as the example 1-2 in FIGS. 10A and 10B. The reference symbols of the lens data of the example 1-2 give the same indication as those of the lens data of the example 1-1 (see FIGS. 5A and 5B).

In the example 1-2, the curvature radius rh9, in the direction of the linear image, of the object-facing surface (i.e., the ninth surface) of the lens L11 of the optical correcting system 13 for correcting light intensity distribution and the curvature radius rh12, in the direction of the linear image, of the image-facing surface (i.e., the twelfth surface) of the tens L12 of the optical correcting system 13 exhibit aspheric surfaces (non-cylindrical surfaces) in the same manner as the example 1-1. FIG. 10B shows aspheric surface data of each of these surfaces. Coefficients presented in FIG. 10B indicate the coefficients in the above equation (A).

Figure 11:
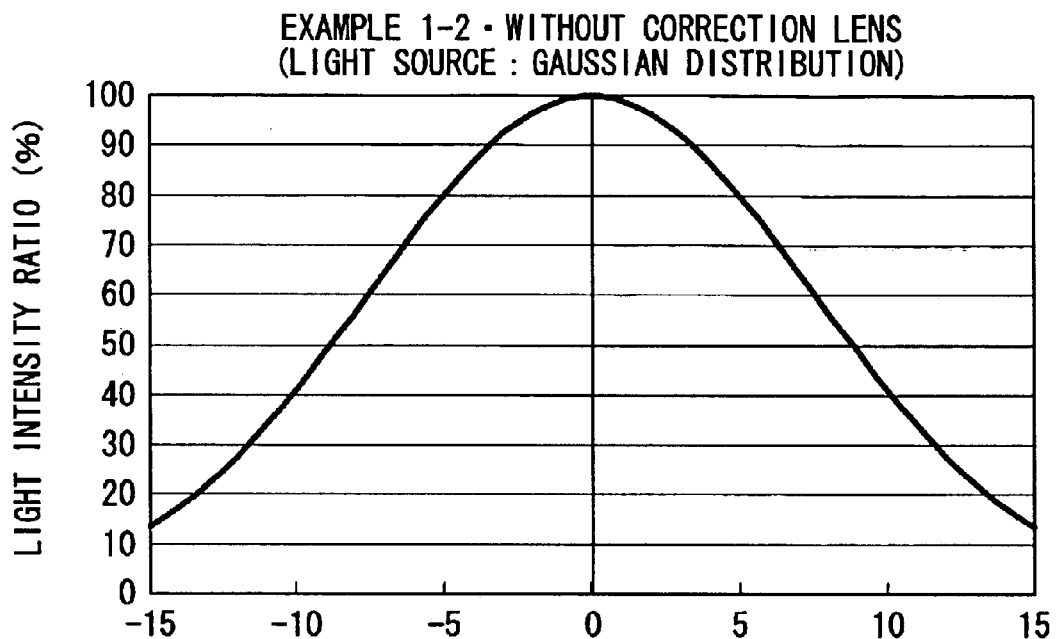
FIG. 11 is a plot showing a light intensity distribution of a linear image which is formed without correcting the light intensity distribution, using a light source emitting light flux having the Gaussian distribution.
Figure 12:
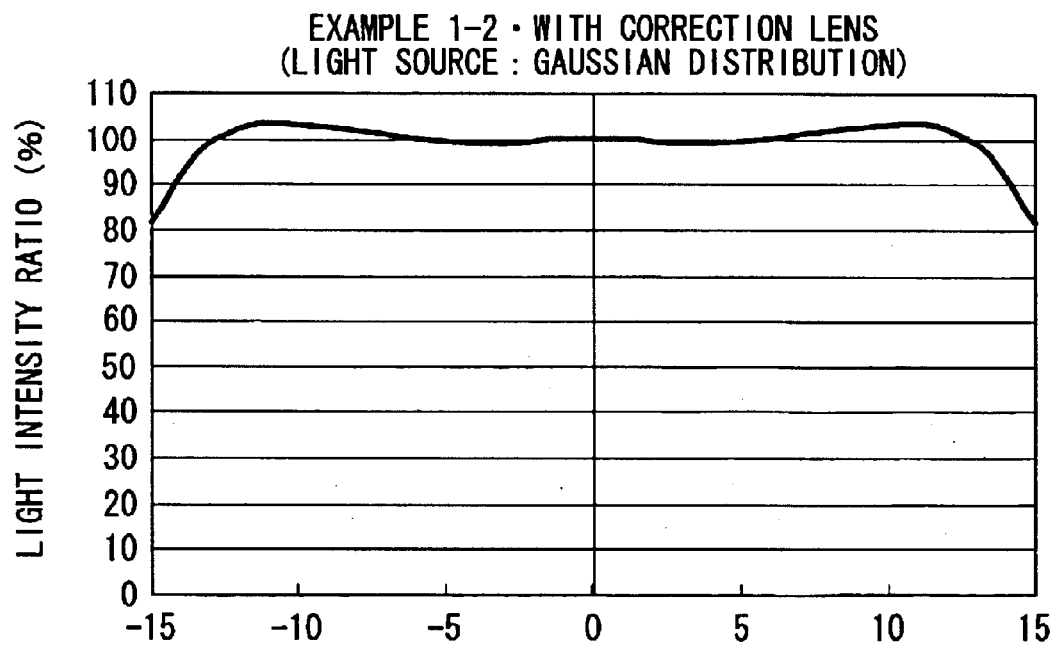
FIG. 12 is a plot showing a light intensity distribution obtained by a one-dimensional optical condensing system according to the example 1-2.

FIG. 12 shows the light intensity distribution of a linear image formed by the one-dimensional optical condensing system of the example 1-2. In FIG. 12, the horizontal axis indicates the coordinate of the linear image in the direction in which the linear image is formed with respect to the optical axis, and the vertical axis indicates the light intensity ratio (%). For reference, the light intensity distribution of a linear image formed without the correction of the light intensity distribution is shown in FIG. 11.

As can be seen from FIG. 12, the optical correcting system of the example 1-2 can achieve a substantially uniform light intensity distribution without reducing the efficiency of use of light of the whole optical correcting system, compared to the uncorrected light intensity distribution (see FIG. 11).

<Example 1-3>

In the example 1-3, the laser array light source shown in FIG. 21 or the like is used as the light source 11, the light intensity distribution of light flux emitted from the light source in the cross section thereof is the Gaussian distribution, and the light flux having the Gaussian distribution are used as illuminating light for illuminating the two-dimensional spatial modulator or the like.

A general configuration of the optical lighting system for correcting light intensity distribution of the example 1-3 corresponds to the configuration of the one-dimensional optical condensing system of the example 1-1 excluding the optical condensing system 14. The optical correcting system 13A for correcting light intensity distribution is composed of two aspherical lenses L11A and L12A which are axisymmetrical.

Only data of the optical correcting system 13A for correcting light intensity distribution, which is a feature of the example 1-3, is shown as lens data in FIGS. 13A and 13B. The reference symbols of the lens data of the example 1-3 give the same indication as those of the lens data of the example 1-1 (see FIGS. 5A and 5B). For easy comparison, the data of each surface of the example 1-3 is designated by the same surface number as the data of the examples 1-1 and 1-2.

Although the curvature radii rhi and rvi in two directions are provided as the curvature radius ri because the optical correcting systems of the examples 1-1 and 1-2 are each the optical correcting system for forming a linear image, the curvature radius ri in each cross-sectional direction is identical (axisymmetrical) because the optical correcting system of the example 1-3 is not the optical correcting system for forming a linear image.

In the example 1-3, the curvature radius r9 of the object-facing surface (i.e., the ninth surface) of the lens L11A of the optical correcting system 13A for correcting light intensity distribution and the curvature radius r12, in the direction of the linear image, of the image-facing surface (i.e., the twelfth surface) of the lens L12A of the optical correcting system 13A exhibit aspheric surfaces. FIG. 13B shows aspheric surface data of each of these surfaces. Coefficients presented in FIG. 13B indicate the coefficients in the above equation (A).

Figure 14:
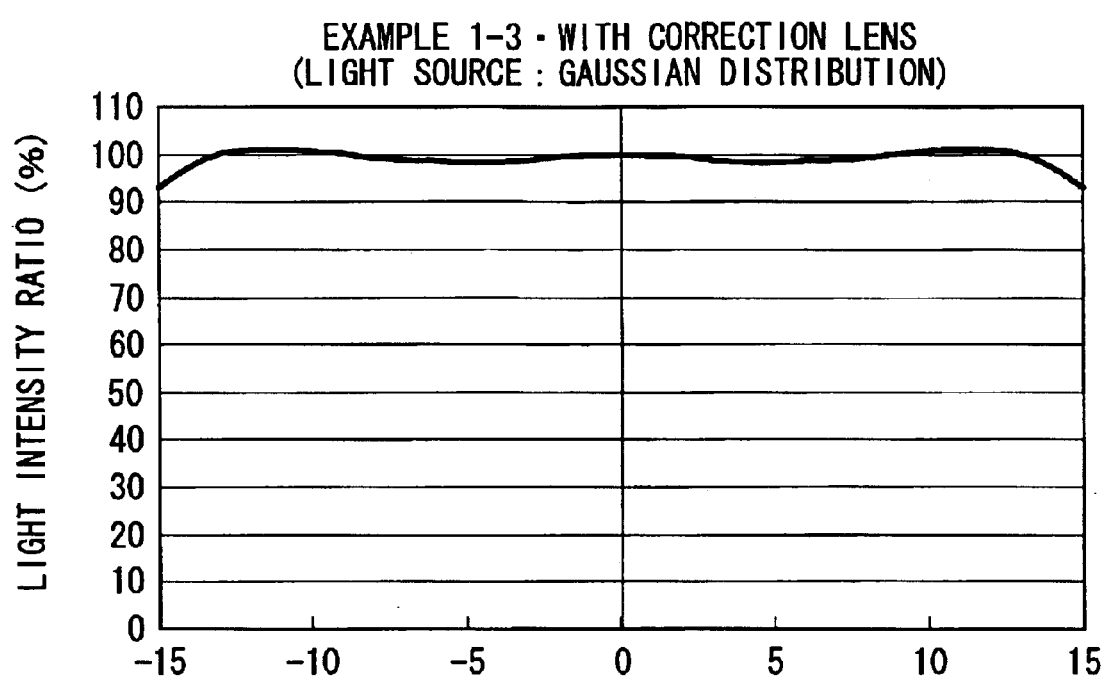
FIG. 14 is a plot showing a light intensity distribution obtained by an optical lighting system for correcting light intensity distribution according to the example 1-3.

FIG. 14 shows the light intensity distribution of illuminating light obtained by the optical lighting system for correcting light intensity distribution of the example 1-3. In FIG. 14, the horizontal axis indicates the coordinate relative to the optical axis, and the vertical axis indicates the light intensity ratio (%). The light intensity distribution obtained without the correction of the light intensity distribution is the same as the light intensity distribution shown in FIG. 11.

As can be seen from FIG. 14, the optical correcting system of the example 1-3 can achieve a substantially uniform light intensity distribution without reducing the efficiency of use of light of the whole optical correcting system, compared to the uncorrected light intensity distribution (see FIG. 11).

Example 2

Examples 2-1 and 2-2

Next, the description is given with regard to two examples of the exposure head corresponding to the second embodiment.

<Example 2-1>

A general configuration of the exposure head of an example 2-1 is substantially the same as that of the exposure head 2 shown in FIGS. 15A and 15B. In the example 2-1, the fiber array light source is used as the light source 11. More specifically, 25 multimode fibers each having a cladding diameter of 60 µm and a core diameter of 25 µm are arranged in the direction in which a linear image is formed, and light flux emitted from the respective end surfaces of the multimode fibers are used. Seven semiconductor lasers are connected to an input end of each multimode fiber. Used are semiconductor lasers which emit light flux whose angle of divergence is equivalent to an NA equal to 0.3 as a whole, whose cross-sectional profile is substantially circular as a whole, and whose light intensity distribution is substantially uniform in the cross section of the light flux.

A lens having an NA equal to 0.3 and a focal length of 50 mm is used as the collimator lens 12. In the same manner as the example 1-1, the optical condensing system 14 is composed of one aspherical cylindrical lens L21 having power in only the direction perpendicular to the linear image 15. A lens having an NA equal to 0.3 and a focal length of 50 mm is used as the optical condensing system 14. A linear image having a width of 25 µm in is formed on the one-dimensional spatial modulator 20 by the optical condensing system 14. In the same manner as the example 1-1, the optical correcting system 13 for correcting light intensity distribution is composed of two lenses L11 and L12 having refractive power in only the longitudinal direction of the linear image 15, which are arranged in this sequence when viewed on the side of the light source 11.

A GLV having an effective length of 27 mm and an effective width of 25 µm is used as the one-dimensional spatial modulator 20. The optical image-forming system 30 is composed of two lens groups 31 and 32, both of which have an NA equal to 0.3 and a focal length of 60 mm. Thus, the optical image-forming system 30 is adapted to form modulated light flux from -the one-dimensional spatial modulator 20 into an image on the exposure surface 40 under 1× magnification.

Zero-order light from the one-dimensional spatial modulator 20 is shielded by the shade 33 provided between the first and second groups 31 and 32 of the optical image-forming system 30, and first-order light is not shielded by the shade 33 but is used for exposure.

The above-described configuration makes it possible to form a linear image having a substantially uniform light intensity distribution on the one-dimensional spatial modulator 20 without reducing the efficiency of use of light of the whole optical correcting system, thereby allowing excellent exposure.

<Example 2-2>

A general configuration of the exposure head of an example 2-2 is also substantially the same as that of the exposure head 2 shown in FIGS. 15A and 15B. In the example 2-2, the fiber array light source is used as the light source 11. More specifically, 25 multimode fibers each having a cladding diameter of 60 µm and a core diameter of 25 µm are arranged in the direction in which a linear image is formed, and light flux emitted from the respective end surfaces of the multimode fibers are used. Seven semiconductor lasers are connected to an input end of each multimode fiber. Used are semiconductor lasers which emit light flux whose angle of divergence is equivalent to an NA equal to 0.2 as a whole, whose cross-sectional profile is substantially circular as a whole, and whose light intensity distribution is substantially uniform in the cross section of the light flux.

A lens having an NA equal to 0.2 and a focal length of 75 mm is used as the collimator lens 12. In the same manner as the example 1-1, the optical condensing system 14 is composed of one aspherical cylindrical lens L21 having power in only the direction perpendicular to the linear image 15. A lens having an NA equal to 0.2 and a focal length of 75 mm is used as the optical condensing system 14. A linear image having a width of 25 µm is formed on the one-dimensional spatial modulator 20 by the optical condensing system 14. In the same manner as the example 1-1, the optical correcting system 13 for correcting light intensity distribution is composed of two lenses L11 and L12 having refractive power in only the longitudinal direction of the linear image 15, which are arranged in this sequence when viewed on the side of the light source 11.

A GLV having an effective length of 27 mm and an effective width of 25 µm is used as the one-dimensional spatial modulator 20. The optical image-forming system 30 is composed of two lens groups 31 and 32, a group of lenses having an NA equal to 0.2 and a focal length of 60 mm is used as the first lens group 31, and a group of lenses having an NA equal to 0.25 and a focal length of 48 mm is used as the second lens group 32. Thus, the optical image-forming system 30 is adapted to form modulated light flux from the one-dimensional spatial modulator 20 into an image on the exposure surface 40 under 0.8× magnification.

Zero-order light from the one-dimensional spatial modulator 20 is shielded by the shade 33 provided between the first and second groups 31 and 32 of the optical image-forming system 30, and first-order light is not shielded by the shade 33 but is used for exposure.

The above-described configuration also makes it possible to form a linear image having a substantially uniform light intensity distribution on the one-dimensional spatial modulator 20 without reducing the efficiency of use of light of the whole optical correcting system, thereby allowing excellent exposure.

Example 3

Next, the description is given with regard to an example of the exposure head corresponding to the third embodiment. A general configuration of the exposure head of an example 3 is substantially the same as that of the exposure head 3 shown in FIGS. 25A and 25B.

In the example 3, light flux emitted from a laser light source and having the Gaussian distribution are used as the light source 11. More specifically, light flux, which have a beam radius having an intensity of $1/e^2$ at the midsection and have an angle of divergence of 34°×17°, are used (where e denotes a base of natural logarithm).

A lens having an NA equal to 0.3 and a focal length of 50 mm is used as the collimator lens 12. The anamorphic prism 83 approximately doubles the width of the light flux in one direction (i.e., the X-direction in. FIG. 25B) so as to change the light flux into collimated light flux having a beam radius (namely, a radius having an intensity of 1/e2) of 29.2 mm. The optical correcting system 13A for correcting light intensity distribution is composed of two aspherical lenses L11A and L12A in the same manner as the example 1-3.

A DMD having an effective range of 24 mm×18 mm is used as the two-dimensional spatial modulator 80. The optical image-forming system 60 is composed of two lens groups 61 and 62, both of which have an NA equal to 0.3 and a focal length of 60 mm. Thus, the optical image-forming system 60 is adapted to form modulated light flux from the two-dimensional spatial modulator 80 into an image on the exposure surface 70 under 1× magnification.

The above-described configuration makes it possible to obtain illuminating light having a substantially uniform light intensity distribution on the two-dimensional spatial modulator 80 without reducing the efficiency of use of light of the whole optical correcting system, thereby allowing excellent two-dimensional exposure.

The invention is not limited to the above-described embodiments and examples, and various modifications of the invention are possible. For example, the values of the curvature radius, the distance between surfaces and the refractive index of each lens component or the like are not limited to the numeric values of the above-described examples but may take on other values.

Although the description has been given with regard to the case where light flux emitted from the light source 11 are collimated by the collimator lens 12 by referring to the above-mentioned embodiments and examples, the collimator lens 12 may be eliminated from the configuration when collimated light flux can be obtained even without the use of the collimator lens 12.

Although the GLV and the DMD are taken as examples of the spatial modulator in the above-mentioned embodiments, a spatial modulator using a PLZT (plomb lanthanum zirconate titanate) element, FLC (ferroelectric liquid crystal) or the like, for example, may be used.

As described above, according to the one-dimensional optical condensing system of a first or second aspect of the invention, the optical correcting system for correcting light intensity distribution changes the width of the light flux at each exit position so that a ratio of the outgoing-light flux width at the peripheral part to the outgoing-light flux width at the midsection near the optical axis may be smaller than a ratio of the incoming-light flux width at the peripheral part to the incoming-light flux width at the midsection. Therefore, the incoming light flux having the same width are changed in such a manner that the light flux width at the midsection is expanded and the light flux width at the peripheral part is reduced. This makes it possible to utilize the light flux at the midsection for the peripheral, so that a linear image having a substantially uniform light intensity distribution can be formed without reducing the efficiency of use of light of the whole optical correcting system.

According to the exposure head of the first aspect, a linear image having a light intensity distribution substantially uniformalized by the optical correcting system for correcting light intensity distribution is formed on the one-dimensional spatial modulator, and the modulated light is used to perform exposure. Therefore, excellent exposure can be performed without reducing the efficiency of use of light of the whole optical correcting system.

According to the optical lighting system for correcting light intensity distribution of the invention, the optical correcting system for correcting light intensity distribution changes the width of the light flux at each exit position so that a ratio of the outgoing-light flux width at the peripheral part to the outgoing-light flux width at the midsection near the optical axis may be smaller than a ratio of the incoming-light flux width at the peripheral part to the incoming-light flux width at the midsection. Therefore, the incoming light flux having the same width are changed in such a manner that the light flux width at the midsection is expanded and the light flux width at the peripheral part is reduced. This makes it possible to utilize the light flux at the midsection for the peripheral, so that the illuminating light having a substantially uniform light intensity distribution can be obtained without reducing the efficiency of use of light of the whole optical correcting system.

According to the exposure head of the second aspect, the two-dimensional spatial modulator is illuminated by illuminating light having a light intensity distribution substantially uniformalized by the optical correcting system for correcting light intensity distribution, and the modulated light is used to perform exposure. Therefore, excellent exposure can be performed without reducing the efficiency of use of light of the whole optical correcting system.

Obviously many modifications and variations of the present invention are possible in the light of the above teachings. It is therefore to be understood that within the scope of the appended claims the invention may be practiced otherwise than as specifically described.

What is claimed is:

1. A one-dimensional optical condensing system which condenses parallel light flux from a light source in one direction so as to form a linear image, comprising:
   an optical correcting system for correcting light intensity distribution, which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection; and
   an optical condensing system which condenses the light flux from the optical correcting system in only one direction, thereby forming a linear image which has a substantially uniform light intensity distribution.

2. A one-dimensional optical condensing system according to claim 1, wherein the optical correcting system has refractive power in only the longitudinal direction of the linear image and does not have power in the direction perpendicular to the linear image.

3. A one-dimensional optical condensing system according to claim 1, wherein the optical correcting system is adapted to provide outgoing light flux having the same overall width as the overall width of incoming parallel light flux, and
   a light flux-width at the midsection is expanded, and a light flux width at the peripheral part is reduced.

4. A one-dimensional optical condensing system according to claim 1, wherein the optical correcting system is adapted to reduce the overall width of incoming parallel light flux so as to provide outgoing light flux having a less overall width, and
   the reduction ratio of a light flux width at the midsection may be smaller than the reduction ratio of a light flux width at the peripheral part.

5. A one-dimensional optical condensing system according to claim 1, wherein the optical correcting system is adapted to expand the overall width of incoming parallel light flux so as to provide outgoing light flux having a larger overall width, and an expansion ratio of a light flux width at the midsection may be larger than an expansion ratio of a light flux width at the peripheral part.

6. A one-dimensional optical condensing system according to claim 1, wherein the optical correcting system makes the light intensity distribution of the linear image substantially uniform so that variations in light intensity of the linear image formed may fall within 30%.

7. A one-dimensional optical condensing system which condenses light flux in one direction so as to form a linear image, comprising:

a light source;

a collimator lens which collimates light flux emitted from the light source;

an optical correcting system for correcting light intensity distribution, which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection; and an optical condensing system which condenses the light flux from the optical correcting system in only one direction, thereby forming a linear image which has a substantially uniform light intensity distribution.

8. A one-dimensional optical condensing system according to claim 7, wherein the optical correcting system has refractive power in only the longitudinal direction of the linear image and does not have power in the direction perpendicular to the linear image.

9. A one-dimensional optical condensing system according to claim 7, wherein the optical correcting system is adapted to provide outgoing light flux having the same overall width as the overall width of incoming parallel light flux, and a light flux-width at the midsection is expanded, and a light flux width at the peripheral part is reduced.

10. A one-dimensional optical condensing system according to claim 7, wherein the optical correcting system is adapted to reduce the overall width of incoming parallel light flux so as to provide outgoing light flux having a less overall width, and the reduction ratio of a light flux width at the midsection may be smaller than the reduction ratio of a light flux width at the peripheral part.

11. A one-dimensional optical condensing system according to claim 7, wherein the optical correcting system is adapted to expand the overall width of incoming parallel light flux so as to provide outgoing light flux having a larger overall width, and an expansion ratio of a light flux width at the midsection may be larger than an expansion ratio of a light flux width at the peripheral part.

12. A one-dimensional optical condensing system according to claim 7, wherein the optical correcting system makes the light intensity distribution of the linear image substantially uniform so that variations in light intensity of the linear image formed may fall within 30%.

13. An exposure head comprising:

a one-dimensional optical condensing system according to claim 7;

a one-dimensional spatial modulator which modulates a linear image formed by the one-dimensional optical condensing system; and an optical image-forming system which forms light flux modulated by the spatial modulator into an image on an exposure surface.

14. An optical lighting system for correcting light intensity distribution comprising:

a light source;

a collimator lens which collimates light flux emitted from the light source so as to form illuminating light; and an optical correcting system which changes the width of the light flux at each exit position so that a ratio of an outgoing-light flux width at a peripheral part to an outgoing-light flux width at a midsection near an optical axis may be smaller than a ratio of an incoming-light flux width at the peripheral part to an incoming-light flux width at the midsection, thereby forming the illuminating light having a substantially uniform light intensity distribution on a surface to be illuminated.

15. An optical lighting system for correcting light intensity distribution according to claim 14, wherein the light source is adapted to emit light flux whose cross-sectional light intensity decreases gradually from a midsection to a peripheral, and the optical correcting system expands a light flux width at a midsection, compared to a light flux width at a peripheral part, and reduces a light flux width at a peripheral part, compared to a light flux width at a midsection.

16. An optical lighting system for correcting light intensity distribution according to claim 14, wherein the optical correcting system makes the light intensity distribution of the illuminating light substantially uniform so that variations in light intensity of the illuminating light formed may fall within 30%.

17. An exposure head comprising:

an optical lighting system for correcting light intensity distribution according to claim 14;

a two-dimendional spatial modulator which modulates the illuminating light from the optical lighting system; and an optical image-forming system which forms light flux modulated by the spatial modulator into an image on an exposure surface.

* * * * *